(12) United States Patent
Minoguchi et al.

(10) Patent No.: US 12,199,671 B2
(45) Date of Patent: Jan. 14, 2025

(54) OPTICAL TRANSMISSION SYSTEM AND OPTICAL TRANSMISSION METHOD

(71) Applicant: Nippon Telegraph and Telephone Corporation, Tokyo (JP)

(72) Inventors: Kyo Minoguchi, Musashino (JP); Toshiaki Shitaba, Musashino (JP); Tomoaki Yoshida, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 39 days.

(21) Appl. No.: 17/925,356

(22) PCT Filed: May 18, 2020

(86) PCT No.: PCT/JP2020/019633
§ 371 (c)(1),
(2) Date: Nov. 15, 2022

(87) PCT Pub. No.: WO2021/234776
PCT Pub. Date: Nov. 25, 2021

(65) Prior Publication Data
US 2023/0246712 A1    Aug. 3, 2023

(51) Int. Cl.
*H04B 10/00*    (2013.01)
*H04B 10/112*    (2013.01)
*H04B 10/2519*    (2013.01)

(52) U.S. Cl.
CPC ..... *H04B 10/2519* (2013.01); *H04B 10/1127* (2013.01)

(58) Field of Classification Search
CPC ................. H04B 10/2519; H04B 10/1127
See application file for complete search history.

(56) References Cited

U.S. PATENT DOCUMENTS 5,608,562 A * 3/1997 Delavaux ........... G02B 6/29376
398/159
5,701,188 A * 12/1997 Shigematsu ....... H04B 10/2525
398/148

(Continued)

FOREIGN PATENT DOCUMENTS

EP    0684709    11/1995
EP    0884866    12/1998

(Continued)

OTHER PUBLICATIONS

[No Author Listed] [online], "Dispersion Compensation," Proximion AB, retrieved on Apr. 26, 2021, retrieved from URL <https://www.proximion.com/dispersion-compensation/>, 8 pages.

(Continued)

*Primary Examiner* — Agustin Bello
(74) *Attorney, Agent, or Firm* — Fish & Richardson P.C.

(57) ABSTRACT

An optical transmission system includes a first optical communication device configured to output an optical signal, a first FBG-DCM configured to perform wavelength dispersion compensation on the optical signal output by the first optical communication device, and a second optical communication device configured to receive the optical signal wavelength-dispersion compensated by the first FBG-DCM through at first optical transmission path of an optical fiber.

4 Claims, 15 Drawing Sheets

(56) References Cited

U.S. PATENT DOCUMENTS

| | | | | |
|---|---|---|---|---|
| 5,943,151 | A * | 8/1999 | Grasso | H04B 10/2519 398/83 |
| 6,137,604 | A * | 10/2000 | Bergano | H04B 10/2519 398/1 |
| 6,157,477 | A * | 12/2000 | Robinson | H04B 10/2519 398/1 |
| 6,292,603 | B1 * | 9/2001 | Mizuochi | G02B 6/12007 385/24 |
| 6,304,691 | B1 * | 10/2001 | Espindola | H04B 10/2519 385/24 |
| 6,307,988 | B1 * | 10/2001 | Eggleton | H04B 10/2519 398/9 |
| 6,370,300 | B1 * | 4/2002 | Eggleton | H04B 10/2519 398/147 |
| 6,411,413 | B1 * | 6/2002 | Bergano | H04B 10/2519 398/200 |
| 6,411,416 | B1 * | 6/2002 | Ooi | H04B 10/2519 398/141 |
| 6,522,455 | B1 * | 2/2003 | Sardesai | G02B 6/29376 359/305 |
| 6,583,907 | B1 * | 6/2003 | Essiambre | H04B 10/2525 398/141 |
| 7,076,173 | B2 * | 7/2006 | Cremer | H04B 10/25133 398/147 |
| 7,324,758 | B2 * | 1/2008 | Marutani | H04B 10/2513 398/208 |
| 7,418,206 | B2 * | 8/2008 | Kawahata | G02B 6/29311 359/589 |
| 7,450,856 | B2 * | 11/2008 | Yoshimoto | H04B 10/25133 398/209 |
| 7,542,685 | B2 * | 6/2009 | Bai | H04B 10/504 398/198 |
| 7,813,647 | B2 * | 10/2010 | Ohtani | H04B 10/25133 398/147 |
| 10,225,016 | B1 * | 3/2019 | Khaleghi | H04J 14/0256 |
| 2001/0024307 | A1 * | 9/2001 | Franco | H04B 10/2525 398/147 |
| 2002/0089724 | A1 * | 7/2002 | Nishimoto | H04J 14/0221 398/141 |
| 2003/0077037 | A1 * | 4/2003 | Ovadia | H04B 10/2519 385/10 |
| 2003/0152387 | A1 * | 8/2003 | Duling | H04B 10/516 398/147 |
| 2003/0215237 | A1 * | 11/2003 | Sugahara | G02B 6/2938 398/147 |
| 2006/0222375 | A1 * | 10/2006 | Raddatz | H04B 10/2519 398/195 |
| 2010/0119237 | A1 * | 5/2010 | DeCusatis | H04B 10/2507 398/147 |
| 2010/0316392 | A1 * | 12/2010 | Onaka | H04B 10/2519 398/159 |
| 2012/0039616 | A1 * | 2/2012 | Striegler | H04B 10/2519 398/149 |
| 2015/0362677 | A1 * | 12/2015 | Wang | G02B 6/268 385/21 |
| 2017/0336567 | A1 * | 11/2017 | Wang | H04B 10/2525 |
| 2023/0246712 | A1 * | 8/2023 | Minoguchi | H04B 10/1127 398/147 |

FOREIGN PATENT DOCUMENTS

| | | |
|---|---|---|
| JP | H07327012 | 12/1995 |
| JP | H10224325 | 8/1998 |
| JP | 2002208892 | 7/2002 |
| JP | 2003229817 | 11/2003 |
| JP | 2011114833 | 6/2011 |
| JP | 2014127796 | 7/2014 |
| WO | WO 1997034379 | 9/1997 |

OTHER PUBLICATIONS

Weinert et al., "40 Gb/s and 4×40 Gb/s TDM/WDM Standard Fiber Transmission," Journal of Lightwave Technology, Nov. 1999, 17(11):2276-2284.

* cited by examiner

| ITEM NUMBER | SYSTEM KIND | TRANSMISSION POWER | LOSS | RECEIVED POWER |
|---|---|---|---|---|
| 1 | OPTICAL TRANSMISSION SYSTEM 200 | 0dBm | OPTICAL TRANSMISSION PATH:10dB DCF:5dB | -15dBm |
| 2 | OPTICAL TRANSMISSION SYSTEM 300 | 0dBm | OPTICAL TRANSMISSION PATH:10dB FBG-DCM:3dB | -13dBm |
| 3 | OPTICAL TRANSMISSION SYSTEM 1 (FIRST EMBODIMENT) | 3dBm | FBG-DCM:3dB OPTICAL TRANSMISSION PATH:10dB | -10dBm |
| 4 | OPTICAL TRANSMISSION SYSTEM 200 | -16dBm | OPTICAL TRANSMISSION PATH:10dB DCF:5dB | -31dBm |
| 5 | OPTICAL TRANSMISSION SYSTEM 1 (FIRST EMBODIMENT) | -13dBm | FBG-DCM:3dB OPTICAL TRANSMISSION PATH:10dB | -26dBm |

FIG. 5

| ITEM NUMBER | SYSTEM KIND | TRANSMISSION POWER | LOSS | RECEIVED POWER |
|---|---|---|---|---|
| 1 | OPTICAL TRANSMISSION SYSTEM 200a | −16dBm | OPTICAL TRANSMISSION PATH:10dB DCF:10dB | −31dBm |
| 2 | OPTICAL TRANSMISSION SYSTEM 1a (SECOND EMBODIMENT) | −13dBm | FBG-DCM:3dB OPTICAL TRANSMISSION PATH:10dB | −26dBm |

FIG. 8

OPTICAL TRANSMISSION SYSTEM AND OPTICAL TRANSMISSION METHOD

CROSS-REFERENCE TO RELATED APPLICATIONS

This application is a National Stage application under 35 U.S.C. § 371 of International Application No. PCT/JP2020/019633, having an International Filing Date of May 18, 2020. The disclosure of the prior application is considered part of the disclosure of this application, and is incorporated by reference in its entirety into this application.

TECHNICAL FIELD

The present invention relates to an optical transmission system and an optical transmission method.

BACKGROUND ART

When an optical signal propagates in an optical fiber in optical fiber communication, the signal has waveform distortion attributable to the wavelength dispersion effect of the optical fiber. Wavelength dispersion is a phenomenon that occurs because the propagation speed of an optical signal through an optical fiber is different for each wavelength, and as the length of the optical fiber increases, the effect of wavelength dispersion increases.

Waveform distortion attributable to wavelength dispersion can be compensated by using a dispersion compensation fiber (hereinafter referred to as "DCF") which has a wavelength dispersion characteristic opposite to the optical fiber of the optical transmission path (see for example NPL 1). DCF stands for Dispersion Compensation Fiber. For example, FIG. 15 is a block diagram of the configuration of a general optical transmission system 100. As shown in FIG. 15, a DCF 140 which is a single mode fiber (hereinafter referred to as "SMF") having a wavelength dispersion characteristic opposite to that of an optical fiber 130 is connected to the succeeding stage of the optical fiber 130, so that the waveform dispersion can be compensated. SMF stands for Single Mode Fiber.

Meanwhile, in recent years, FBG-DCMs (Fiber Bragg Gratings-based continuous Dispersion Compensation Modules) using a fiber Bragg grating (hereinafter referred to as "FBG") have received attention as a new wavelength dispersion compensation device (see, for example, NPL 2). The FBG-DCM is characterized by its low loss and extremely low nonlinearity when compared to DCFs. Waveform distortion attributable to nonlinear optical effects is less likely to be caused because of the characteristics even when large optical power is input.

CITATION LIST

Non Patent Literature

[NPL 1] C. M. Weinert et al, "40 Gb/s 4×40 Gb/s TDM/WDM Standard Fiber Transmission", Journal of Lightwaver Technology, 1999 November, Vol. 17, No. 11, pp. 2276-2284 [NPL 2] "Dispersion Compensation", Proximation AB, [Online], [retrieved on Apr. 26, 2020], retrieved from the Internet: <URL: https://www.proximion.com/dispersion-compensation/>

SUMMARY OF THE INVENTION

Technical Problem

In optical fiber communication, the quality of received signals can be improved by improving the optical signal-to-noise ratio (hereinafter referred to as "OSNR"). As a result, the transmission distance can be increased. OSNR stands for Optical Signal-to-Noise Ratio. OSNR can be improved by increasing optical power at the time of transmission. However, due to the nonlinear optical effects of optical fibers, optical signals with large power cause waveform distortion. Therefore, there is a problem that the improvement in the quality of received signals can be limited.

While the DCF can compensate for waveform distortion attributable to wavelength dispersion as described above, there is a problem that waveform distortion attributable to nonlinear optical effects occurs when the optical power at the time of transmission is increased. On the other hand, use of the FBG-DCM can compensate for waveform distortion attributable to wavelength dispersion while increasing optical power at the time of transmission. However, since the FBG-DCM itself has an insertion loss, simply using the FBG-DCM in an optical transmission system may not improve the quality of received signals as expected.

With the foregoing in view, it is an object of the invention to provide a technique which can improve the quality of received signals.

Means for Solving the Problem

An optical transmission system according to one aspect of the invention includes a first optical communication device configured to output an optical signal, a first FBG-DCM configured to perform wavelength dispersion compensation on the optical signal output by the first optical communication device, and a second communication device configured to receive the optical signal wavelength-dispersion compensated by the first FBG-DCM through a first optical transmission path of an optical fiber.

An optical transmission method according to one aspect of the invention is a method in an optical transmission system including a first optical communication device, a second optical communication device, and a first FBG-DCM, and the first optical communication device outputs an optical signal, the first FBG-DCM performs wavelength dispersion compensation on the optical signal output by the first optical communication device, and the second optical communication device receives the optical signal wavelength-dispersion compensated by the first FBG-DCM through a first transmission path of an optical fiber.

Effects of the Invention

According to the invention, the quality of received signals can be improved.

BRIEF DESCRIPTION OF DRAWINGS

FIG. 5 is a table showing the relation between transmission power and received power in the optical transmission systems shown in FIGS. 1, 3, and 4.

FIG. 8 is a table showing the relation between transmission power and received power in the optical transmission systems shown in FIGS. 6 and 7.

DESCRIPTION OF EMBODIMENTS

First Embodiment

Figure 1:
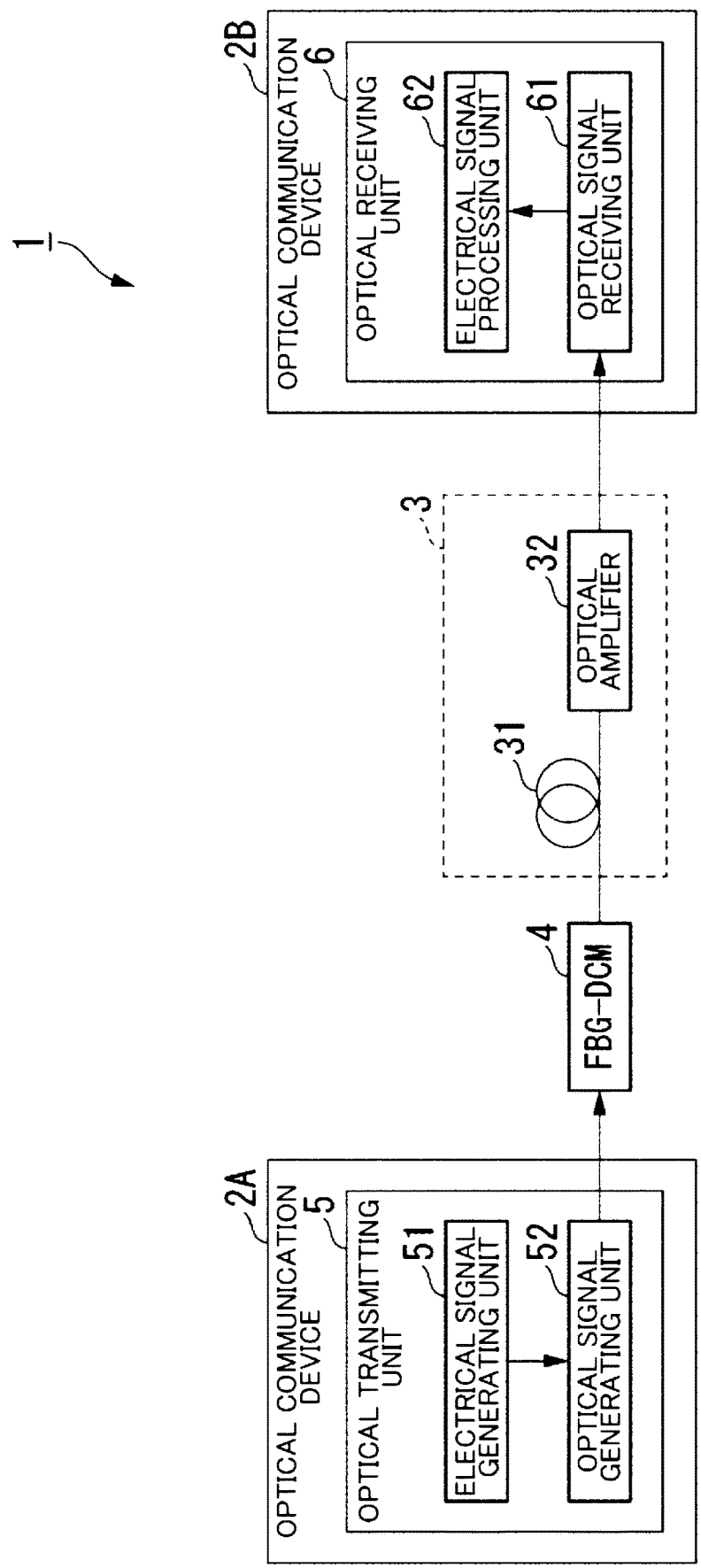
FIG. 1 is a block diagram of the configuration of an optical transmission system according to a first embodiment of the invention.

Hereinafter, embodiments of the invention will be described in conjunction with the accompanying drawings. FIG. 1 is a block diagram of the configuration of an optical transmission system 1 according to a first embodiment of the invention. The optical transmission system 1 includes an optical communication device 2A (a first optical communication device), an optical communication device 2B (a second optical communication device), an optical transmission path 3, and an FBG-DCM 4 (a first FBG-DCM).

The optical transmission path 3 includes an optical fiber 31 and an optical amplifier 32. The optical fiber 31 is a transmission medium for optical signals, and for example an SSMF (Standard Single Mode Fiber) is used. The optical amplifier 32 amplifies optical signals. The configuration shown in the optical transmission path 3 is an example only, and the optical amplifier 32 may be inserted in the middle of the optical fiber 31 or a device other than the optical amplifier 32 such as an optical switch and a regenerative repeater may be connected to the optical fiber 31 or inserted in the middle of the optical fiber 31.

The FBG-DCM 4 is a wavelength dispersion compensation device and provided between the optical communication device 2A and the optical transmission path 3. The FBG-DCM 4 is connected to the optical communication device 2A and the optical transmission path 3 through the optical fiber.

The optical communication device 2A includes an optical transmitting unit 5. The optical transmitting unit 5 is connected to the FBG-DCM 4 through the optical fiber. The optical transmitting unit 5 includes an electrical signal generating unit 51 and an optical signal generating unit 52. The electrical signal generating unit 51 encodes the transmission data as an information source, converts the encoded transmission data into an electrical signal, and outputs the signal to the optical signal generating unit 52. The optical signal generating unit 52 converts the electrical signal output by the electrical signal generating unit 51 into an optical signal and outputs the optical signal to the optical fiber connected to the optical transmitting unit 5.

The optical communication device 2B includes an optical receiving unit 6. The optical receiving unit 6 is connected to the optical transmission path 3. The optical receiving unit 6 includes an optical signal receiving unit 61 and an electrical signal processing unit 62. The optical signal receiving unit 61 receives an optical signal transmitted through the optical transmission path 3, converts the received optical signal into an electrical signal, and outputs the signal to the electrical signal processing unit 62. The electrical signal processing unit 62 decodes the electrical signals output by the optical signal receiving unit 61 and restores the transmission data.

Processing According to First Embodiment

Figure 2:
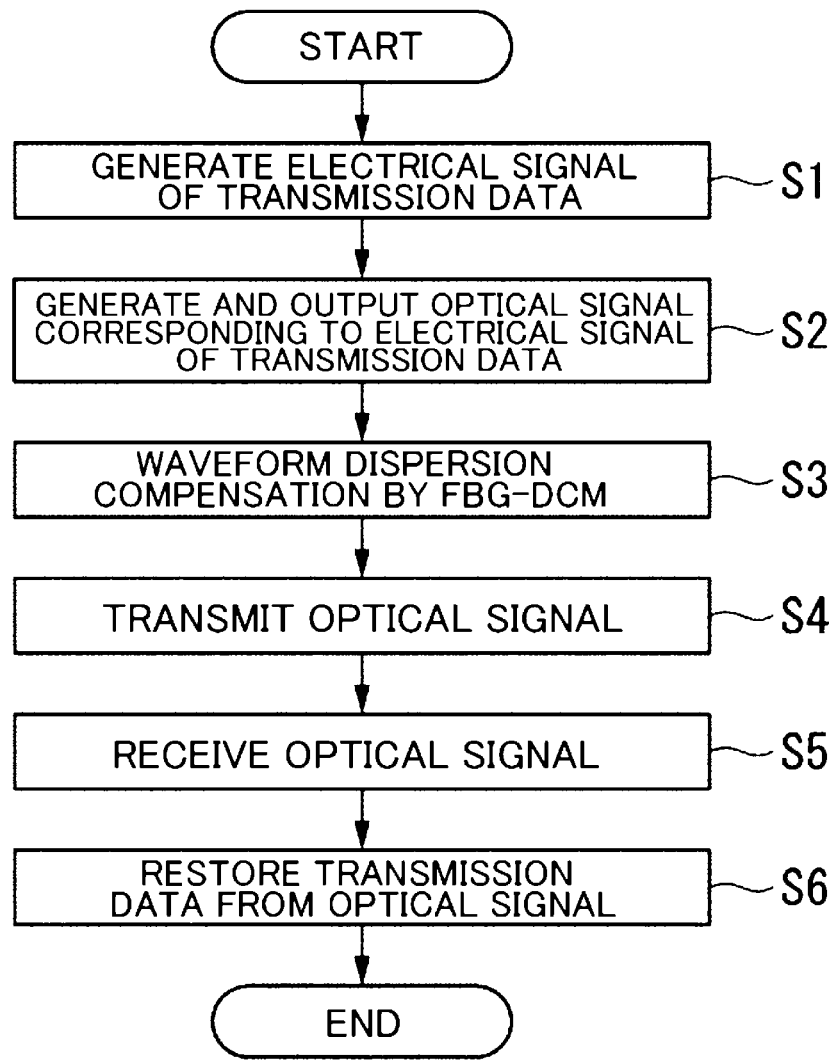
FIG. 2 is a flowchart for illustrating the flow of processing steps carried out by the optical transmission system according to the first embodiment.

FIG. 2 is a flowchart for illustrating the flow of processing steps carried out by the optical transmission system 1 according to the first embodiment. The electrical signal generating unit 51 encodes transmission data and converts the encoded transmission data into an electrical signal to generate the electrical signal. The electrical signal generating unit 51 outputs the generated electrical signal of the transmission data to the optical signal generating unit 52 (step S1). The optical signal generating unit 52 obtains the electrical signal output by the electrical signal generating unit 51. The optical signal generating unit 52 converts the obtained electrical signal into an optical signal. The optical signal generating unit 52 outputs the optical signal obtained by the conversion to the optical fiber connected to the optical transmitting unit 5 (step S2).

The FBG-DCM 4 obtains an optical signal output by the optical communication device 2A. The FBG-DCM 4 performs wavelength dispersion compensation on the obtained optical signal. The FBG-DCM 4 outputs, to the optical transmission path 3, the optical signal after the wavelength dispersion compensation (step S3). The optical signal output by the FBG-DCM 4 is amplified by the optical amplifier 32 and then input to the optical communication device 2B (step S4).

The optical signal receiving unit 61 receives the input optical signal. The optical signal receiving unit 61 converts the received optical signal into an electrical signal and outputs the resulting signal to the electrical signal processing unit 62 (step S5). The electrical signal processing unit 62 obtains the electrical signal output by the optical signal receiving unit 61. The electrical signal processing unit 62 decodes the obtained electrical signal and restores the transmission data (step S6).

Effects According to First Embodiment

Figure 3:
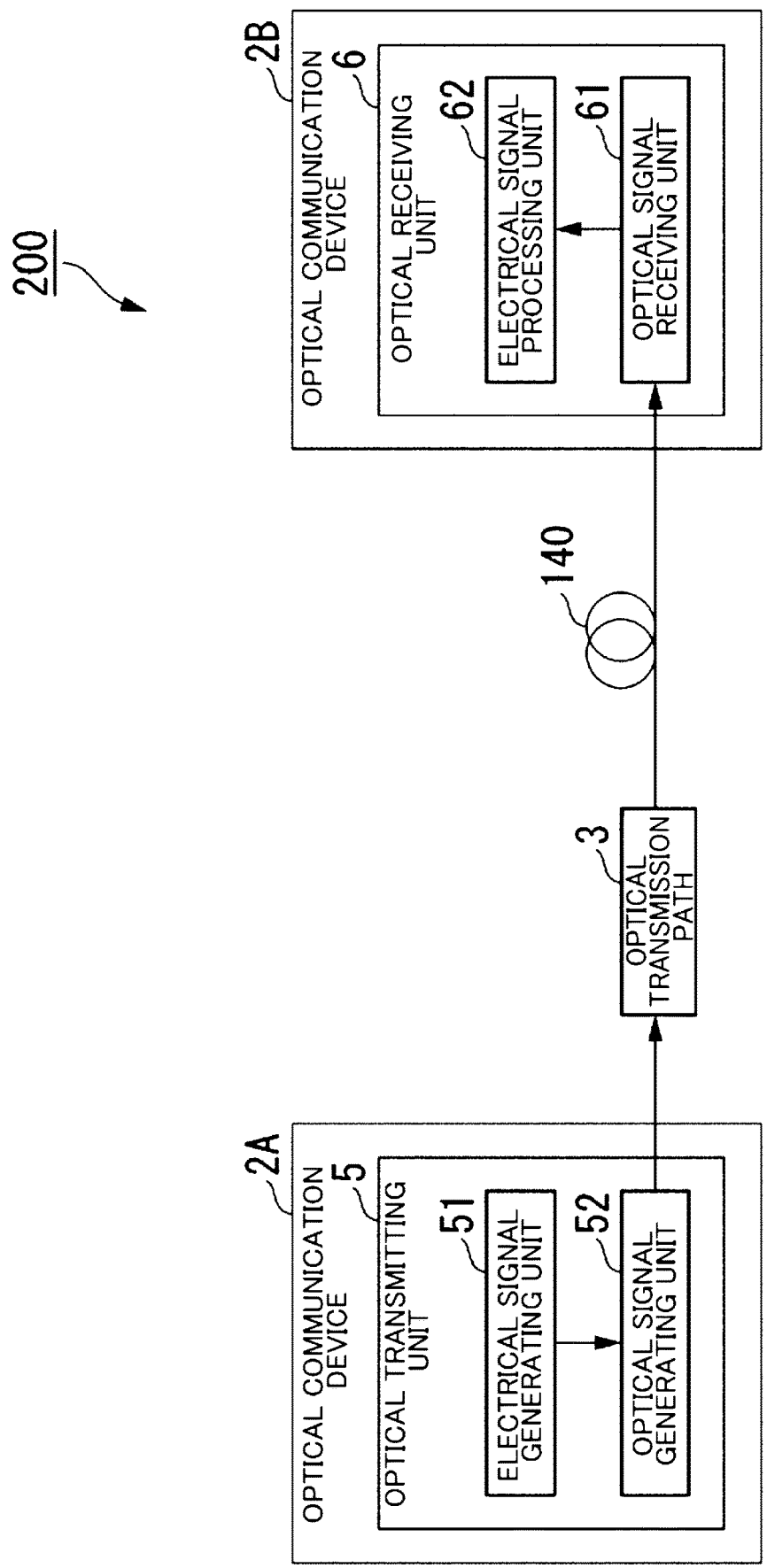
FIG. 3 is a block diagram (first case) of the configuration of an optical transmission system including a DCF.
Figure 4:
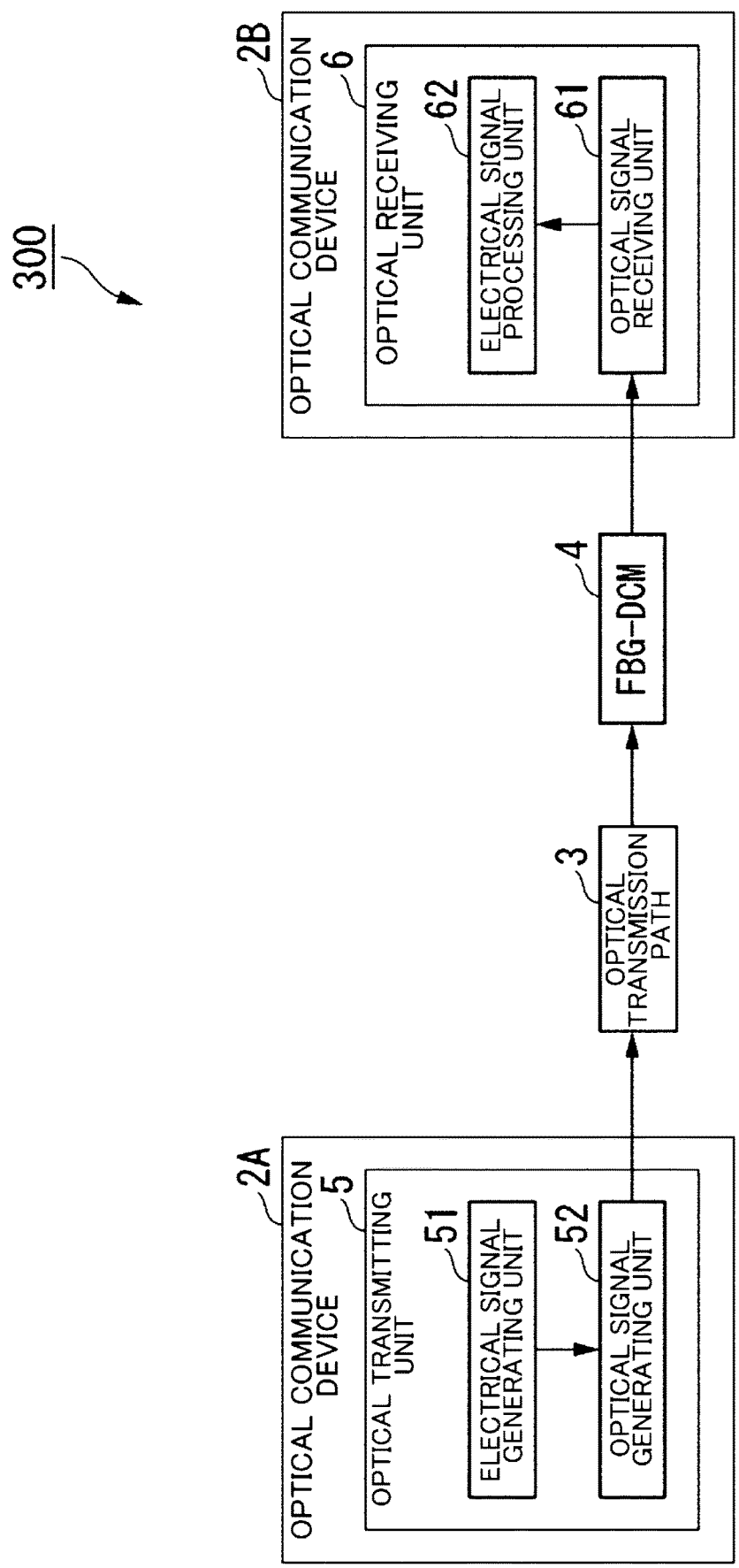
FIG. 4 is a block diagram of the configuration of an optical transmission system having an FGB-DCM inserted in a position closer to an optical communication device including an optical receiving unit.

Now, effects brought about by the optical transmission system 1 according to the first embodiment will be described with reference to FIGS. 3 to 5. FIG. 3 is a block diagram of an optical transmission system 200. In the optical transmission system 200, a DCF 140 is used instead of the FBG-DCM 4 in the configuration of the optical transmission system 1, and the DCF 140 is inserted between the optical transmission path 3 and the optical communication device 2B. FIG. 4 is a block diagram of an optical transmission system 300. In the optical transmission system 300, the FBG-DCM 4 is inserted between the optical transmission path 3 and the optical communication device 2B. In FIG. 3 and FIG. 4, the same elements as those in the optical transmission system 1 are designated by the same reference characters.

FIG. 5 is a table showing the relation among transmission power, loss in transmission, and received power in the optical transmission system 200, the optical transmission system 300, and the optical transmission system 1. The transmission power in FIG. 5 is the power of the optical signal generated and output by the optical signal generating unit 52 of the optical communication device 2A. The received power in FIG. 5 is the power of the optical signal that is received by the optical signal receiving unit 61 of optical communication device 2B. In the table shown in FIG. 5, the loss in the optical transmission path 3 is "10 dB" and the loss in the DCF 140 is "5 dB", and the loss in the FBG-DCM 4 is "3 dB".

In the example shown in the row of item number 1, the transmission power of the optical transmission system 200 is set to "0 dBm", this is because the upper limit for the input optical power must be "0 dBm" for the SSMF optical fiber 31 and the DCF 140 of the optical transmission path 3 in order to reduce the nonlinear optical effect.

In the example shown in the row of item number 2, the transmission power in the optical transmission system 300 is also set to "0 dBm", but the FBG-DCM 4 is not inserted on the side of the optical communication device 2A which outputs the optical signal in the optical transmission system 300. Therefore, similarly to the optical transmission system 200, the upper limit for the input optical power must be "0 dBm" in order to reduce the nonlinear optical effect.

In contrast, as shown in the row of item number 3, in the optical transmission system 1, the FBG-DCM 4 is inserted closer to the optical communication device 2A. Specifically, in the optical transmission system 1, the FBG-DCM 4 is inserted in the stage preceding the optical transmission path 3. This allows the optical power to be increased during transmission by the optical communication device 2A, and therefore the power is set to "3 dBm".

As can be seen from comparison between the value "−15 dBm" in the "received power" in the row of item number 1 and the values "−13 dBm" and "−10 dBm" in the rows of item numbers 2 and 3, the received power obtained using the FBG-DCM 4 is higher than the power obtained using DCF 140. As can be seen from comparison between the value "−13 dBm" in the "received power" in the row of item number 2 and the value "−10 dBm" in the "received power" in the row of item number 3, the optical transmission system 1 having the FBG-DCM 4 provided closer to the optical communication device 2A can provide greater transmission power, and therefore the received power can be greater. Therefore, the resulting received power can be greater using the FBG-DCM 4 than using the DCF 140. When the FBG-DCM 4 is inserted on the optical signal transmission side, even greater power is received.

The rows of item numbers 4 and 5 show the minimum necessary transmission power in comparison when the minimum light receiving sensitivity of the optical signal receiving unit 61 of the optical communication device 2B is "−30 dBm. As shown in the row of item number 4, in the optical transmission system 200, when the transmission power of the optical signal generated by the optical signal generating unit 52 is set to "−16 dBm", the power received at the optical signal receiving unit 61 is "−31 dBm" which is less than the minimum light receiving sensitivity "−30 dBm". Therefore, in the optical transmission system 200, the transmission power of the optical signal generated by the optical signal generating unit 52 must be set to at least "−15 dBm" in order to satisfy the minimum light receiving sensitivity.

In contrast, as shown in the row of item number 5, in the optical transmission system 1 according to the first embodiment, even when the transmission power of the optical signal generated by the optical signal generating unit 52 is set to "−13 dBm", the received power at the optical signal receiving unit 61 is "−26 dBm", which satisfies the minimum light receiving sensitivity. Therefore, when the transmission power of the optical signal generated by the optical signal generating unit 52 is at least "−17 dBm", the minimum light receiving sensitivity of the optical signal receiving unit 61 can be satisfied. Therefore, the optical transmission system 1 according to the first embodiment can satisfy the minimum light receiving sensitivity of the optical signal receiving unit 61 with smaller transmission power than that of the optical transmission system 200.

In the optical transmission system 1 according to the first embodiment, the optical communication device 2A outputs an optical signal. The optical communication device 2B receives the optical signal output by the optical communication device 2A and transmitted through the optical transmission path 3. The FBG-DCM 4 is inserted between the optical communication device 2A and the optical transmission path 3, receives the optical signal output by the optical communication device 2A, performs wavelength dispersion compensation on the received optical signal, and outputs the resulting signal to the optical transmission path 3.

As the FBG-DCM 4 is inserted, the waveform distortion attributable to wavelength dispersion can be compensated while suppressing the nonlinear optical effects if the transmission power of the optical signal is increased. Since the power of the optical signal to be transmitted can be increased, the OSNR can be improved. Therefore, the quality of received signals can be improved and the transmission distance can be increased. As described above, when the minimum light receiving sensitivity is determined, the minimum light receiving sensitivity can be secured with less transmission power by using the FBG-DCM 4 than by using the DCF 140. In this way, the minimum light receiving sensitivity can be achieved with reduced transmission power. As the FBG-DCM 4 is inserted closer to the optical communication device 2A which includes the optical transmitting unit 5, the optical signal can be transmitted with greater transmission power, which improves the quality of received signals.

Second Embodiment

Figure 6:
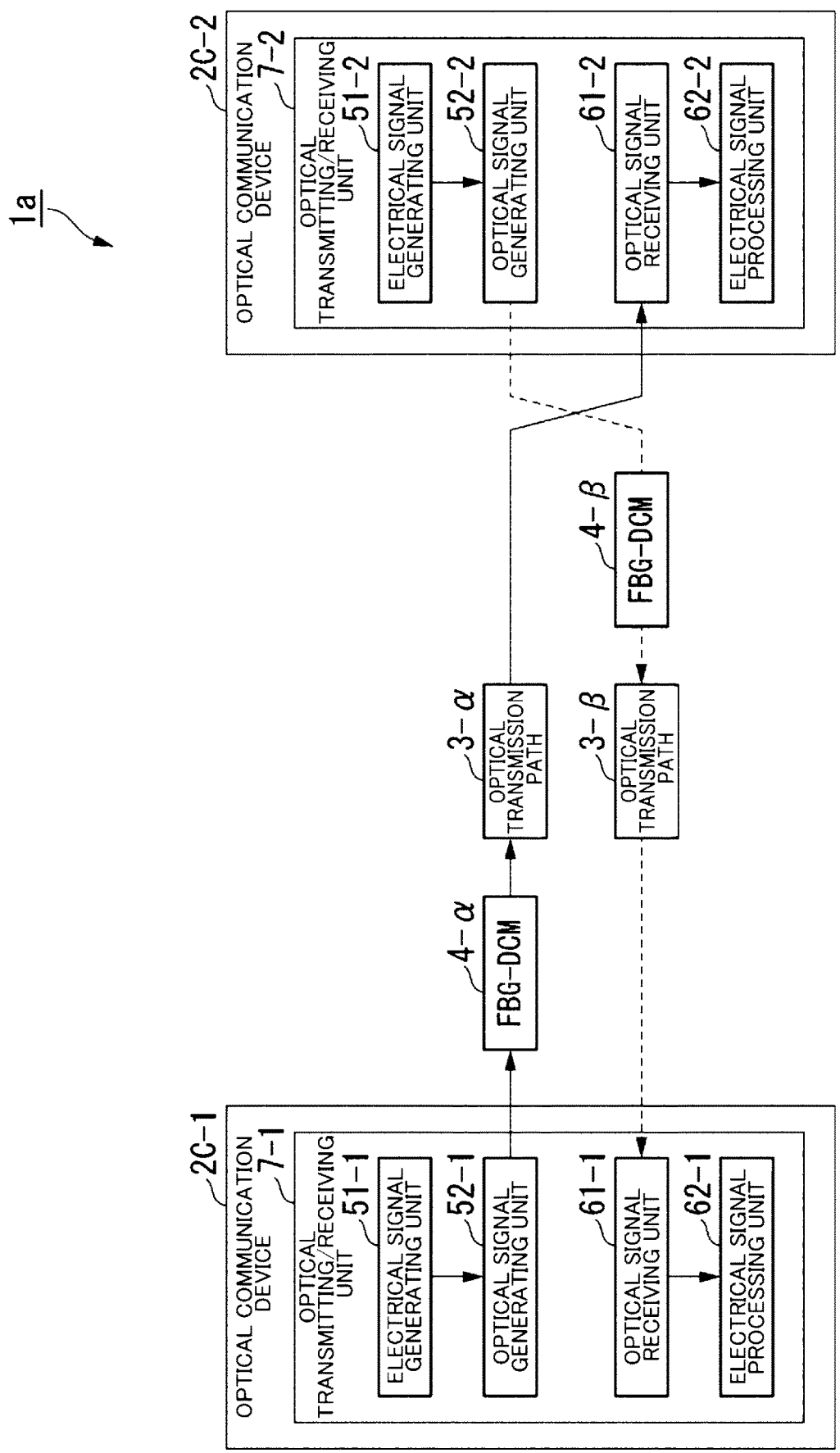
FIG. 6 is the block diagram of the configuration of an optical transmission system according to a second embodiment of the invention.

FIG. 6 is a block diagram of an optical transmission system 1a according to a second embodiment of the invention. The optical transmission system 1a includes optical communication devices 2C-1 and 2C-2, an FBG-DCM 4-α (a first FBG-DCM), a 4-β (a second FBG-DCM), and optical transmission paths 3-α and 3-β.

The FBG-DCMs 4-α and 4-β have the same configuration as the FBG-DCM 4 according to the first embodiment. The optical transmission paths 3-α and 3-β have the same configuration as the optical transmission path 3 according to the first embodiment.

The optical communication device 2C-1 includes an optical transmitting/receiving unit 7-1. The optical transmitting/ receiving unit 7-1 includes an electrical signal generating unit 51-1, an optical signal generating unit 52-1, an optical signal receiving unit 61-1, and an electrical signal processing unit 62-1. The optical communication device 2C-2 includes an optical transmitting/receiving unit 7-2. The optical transmitting/receiving unit 7-2 includes an electrical signal generating unit 51-2, an optical signal generating unit 52-2, an optical signal receiving unit 61-2, and an electrical signal processing unit 62-2.

The electrical signal generating units 51-1 and 51-2 have the same configuration as the electrical signal generating unit 51 according to the first embodiment. The optical signal generating units 52-1 and 52-2 have the same configuration as the optical signal generating unit 52 according to the first embodiment. The optical signal receiving units 61-1 and 61-2 have the same configuration as the optical signal receiving unit 61 according to the first embodiment. The electrical signal processing units 62-1 and 62-2 have the same configuration as the electrical signal processing unit 62 according to the first embodiment.

The optical signal generating unit 52-1 of the optical communication device 2C-1 is connected to the optical signal receiving unit 61-2 of the optical communication device 2C-2 through the FBG-DCM 4-$a$ and the optical transmission path 3-$a$. The path through the FBG-DCM 4-$a$ and the optical transmission path 3-$a$ serves as a transmission path from the optical communication device 2C-1 to the optical communication device 2C-2.

The optical signal generating unit 52-2 of the optical communication device 2C-2 is connected to the optical signal receiving unit 61-1 of the optical communication device 2C-1 through the FBG-DCM 4-13 and the optical transmission path 3-13. The path through the FBG-DCM 4-13 and the optical transmission path 3-13 serves as a transmission path from the optical communication device 2C-2 to the optical communication device 2C-1.

In other words, in the optical transmission system 1$a$ according to the second embodiment, the optical communication devices 2C-1 and 2C-2 respectively have the optical transmitting/receiving units 7-1 and 7-2 each including the optical transmitting unit 5 and the optical receiving unit 6 according to the first embodiment in an integrated manner and are configured to transmit and receive optical signals from each other.

Therefore, the optical transmission system 1$a$ according to the second embodiment performs the same processing as that performed by the optical transmission system 1 according to the first embodiment shown in FIG. 2 by the combination of the electrical signal generating unit 51-1, the optical signal generating unit 52-1, the FBG-DCM 4-$a$, the optical transmission path 3-$a$, the optical signal receiving unit 61-2, and the electrical signal processing unit 62-2. The optical transmission system 1$a$ according to the second embodiment performs the same processing as that performed by the optical transmission system 1 according to the first embodiment shown in FIG. 2 by the combination of the electrical signal generating unit 51-2, the optical signal generating unit 52-2, the FBG-DCM 4-13, the optical transmission path 3-13, the optical signal receiving unit 61-1, and the electrical signal processing unit 62-1.

Effects According to Second Embodiment

Figure 7:
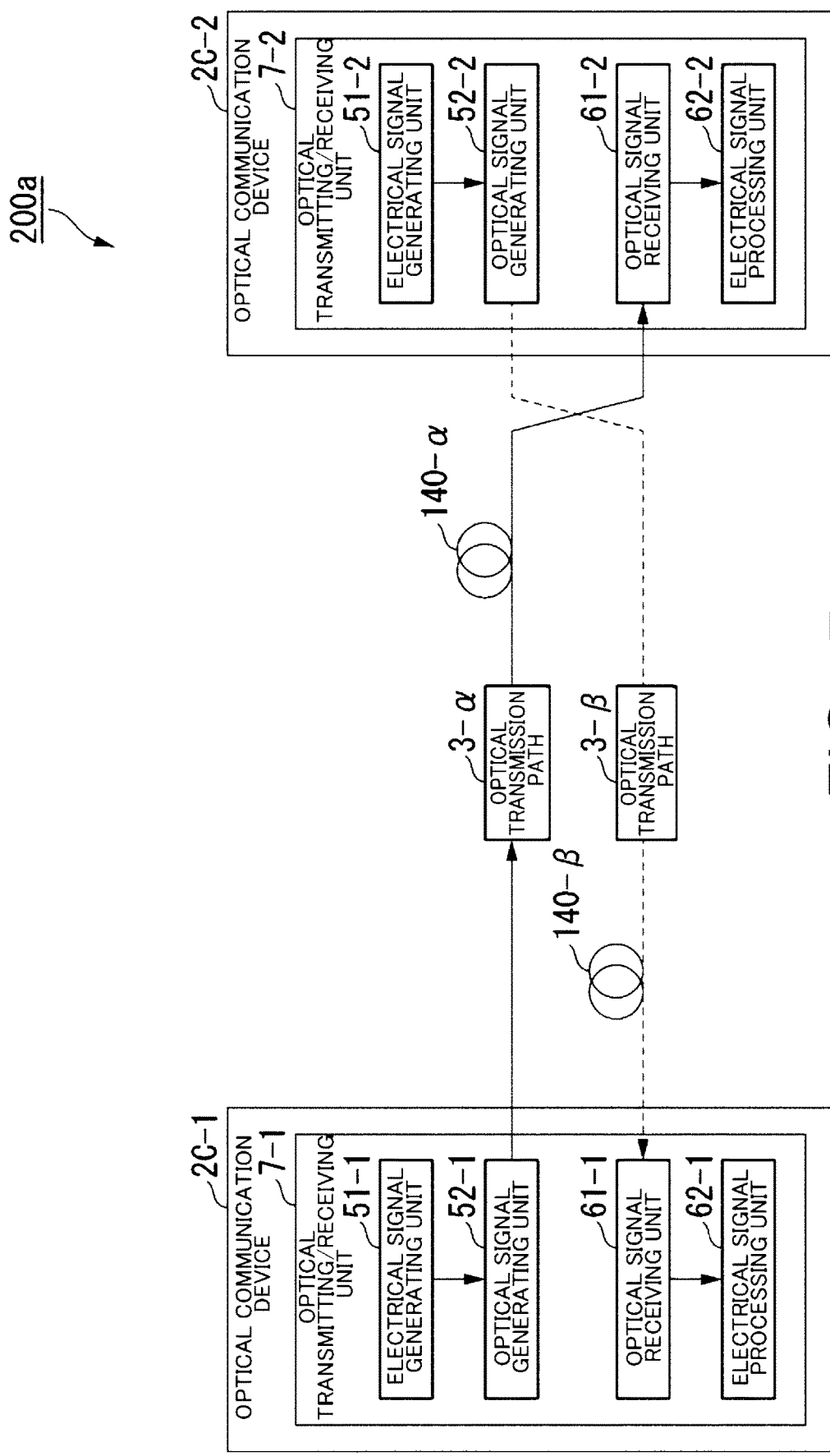
FIG. 7 is a block diagram (second case) of the configuration of an optical transmission system including a DCF.

Now, effects brought about by the optical transmission system 1$a$ according to the second embodiment will be described with reference to FIGS. 7 and 8. FIG. 7 is a block diagram of the optical transmission system 200$a$. In the optical transmission system 200$a$, DCFs 140-$a$ and 140-13 are used instead of the FBG-DCMs 4-$a$ and 4-13 in the configuration of optical transmission system 1$a$. The DCF 140-$a$ is inserted between the optical transmission path 3-$a$ and the optical communication device 2C-2, and the DCF 140-13 is inserted between the optical transmission path 3-13 and the optical communication device 2C-1. In FIG. 7, the same elements as those of the optical transmission system 1$a$ shown in FIG. 6 are designated by the same reference characters.

FIG. 8 is a table showing the relation between the transmission power, the loss in transmission, and the received power in the optical transmission system 200$a$ and the optical transmission system 1$a$. The transmission power in FIG. 8 refers to the power of the optical signal generated and output by the optical signal generating unit 52-1 of the optical communication device 2C-1 or the optical signal generating unit 52-2 of the optical communication device 2C-2. The received power in FIG. 8 refers to the power of the optical signal received by the optical signal receiving unit 61-2 of optical communication device 2C-2 or the optical signal receiving unit 61-1 of the optical communication device 2C-1. In the table shown in FIG. 8, the loss through the optical transmission paths 3-$\alpha$ and 3-$\beta$ is "10 dB", the loss through the DCFs 140-$\alpha$ and 140-$\beta$ is "5 dB", and the loss through the FBG-DCMs 4-$\alpha$ and 4-$\beta$ is "3 dB".

Item numbers 1 and 2 show the minimum necessary transmission power for each of the optical signal receiving units 61-1 and 61-2 in comparison for the minimum light receiving sensitivity is "−30 dBm". As shown in the row of item number 1, in the optical transmission system 200$a$, when the transmission power of the optical signals generated by the optical signal generating units 52-1 and 52-2 is set to "−16 dBm", the received power at the optical signal receiving units 61-2 and 61-2 opposed to each other is "−31 dBm", which indicates that the minimum light receiving sensitivity "−30 dBm" cannot be satisfied. Therefore, in the optical transmission system 200$a$, in order to satisfy the minimum light receiving sensitivity, the power of the optical signal generated by each of the optical signal generating units 52-1 and 52-2 must be at least "−15 dBm".

In contrast, as shown in the row of item number 2, in the optical transmission system 1$a$ according to the second embodiment, when the transmission power of the optical signal generated by each of the optical signal generating units 52-1 and 52-2 is "−13 dBm", the received power at each of the optical signal receiving units 61-2 and 61-1 is "−26 dBm", and therefore the minimum light receiving sensitivity can be satisfied. Therefore, when the transmission power of each of the optical signals generated by the optical signal generating units 52-1 and 52-2 is at least "−17 dBm", the minimum light receiving sensitivity for the optical signal receiving units 61-2 and 61-1 can be satisfied. Therefore, the optical transmission system 1$a$ according to the second embodiment can satisfy the minimum light receiving sensitivity for the optical signal receiving units 61-2 and 61-1 with smaller transmission power than that of the optical transmission system 200$a$.

In the optical transmission system 1$a$ according to the second embodiment described above, the optical communication device 2C-1 outputs an optical signal. The optical communication device 2C-2 receives the optical signal output by the optical communication device 2C-1 and transmitted by the optical transmission path 3-$a$. The optical communication device 2C-2 outputs an optical signal. The optical communication device 2C-1 receives the optical signal output by the optical communication device 2C-2 and transmitted by the optical transmission path 3-β.

In the optical transmission system 1a, the FBG-DCM 4-α is inserted between the optical communication device 2C-1 and the optical transmission path 3-α, receives an optical signal output by the optical communication device 2C-1, performs wavelength dispersion compensation on the received optical signal, and outputs the resulting signal to the optical transmission path 3-α. The FBG-DCM 4-β is inserted between the optical communication device 2C-2 and the optical transmission path 3-β, receives the optical signal output by the optical communication device 2C-2, performs wavelength dispersion compensation on the received optical signal, and outputs the resulting signal to the optical transmission path 3-β.

The insertion of the FBG-DCMs 4-α and 4-β allows the waveform distortion attributable to wavelength dispersion to be compensated while reducing nonlinear optical effects when the power of each of the optical signal's output by the optical communication devices 2C-1 and 2C-2 is increased. Since the power of each of the optical signals output by the optical communication devices 2C-1 and 2C-2 can be increased, the OSNR can be improved. As a result, the quality of received signals can be improved and the transmission distance can be increased. As described above, when the minimum light receiving sensitivity is determined, the minimum light-receiving sensitivity can be achieved with less transmission power than the case of using the DCFs 140-α and 140-β. The FBG-DCMs 4-α and 4-β are inserted in positions closer to the optical signal generating units 52-1 and 52-2 of the optical communication devices 2C-1 and 2C-2, so that optical signals with greater transmission power can be transmitted, and therefore the quality of received signals can be improved.

Third Embodiment

Figure 9:
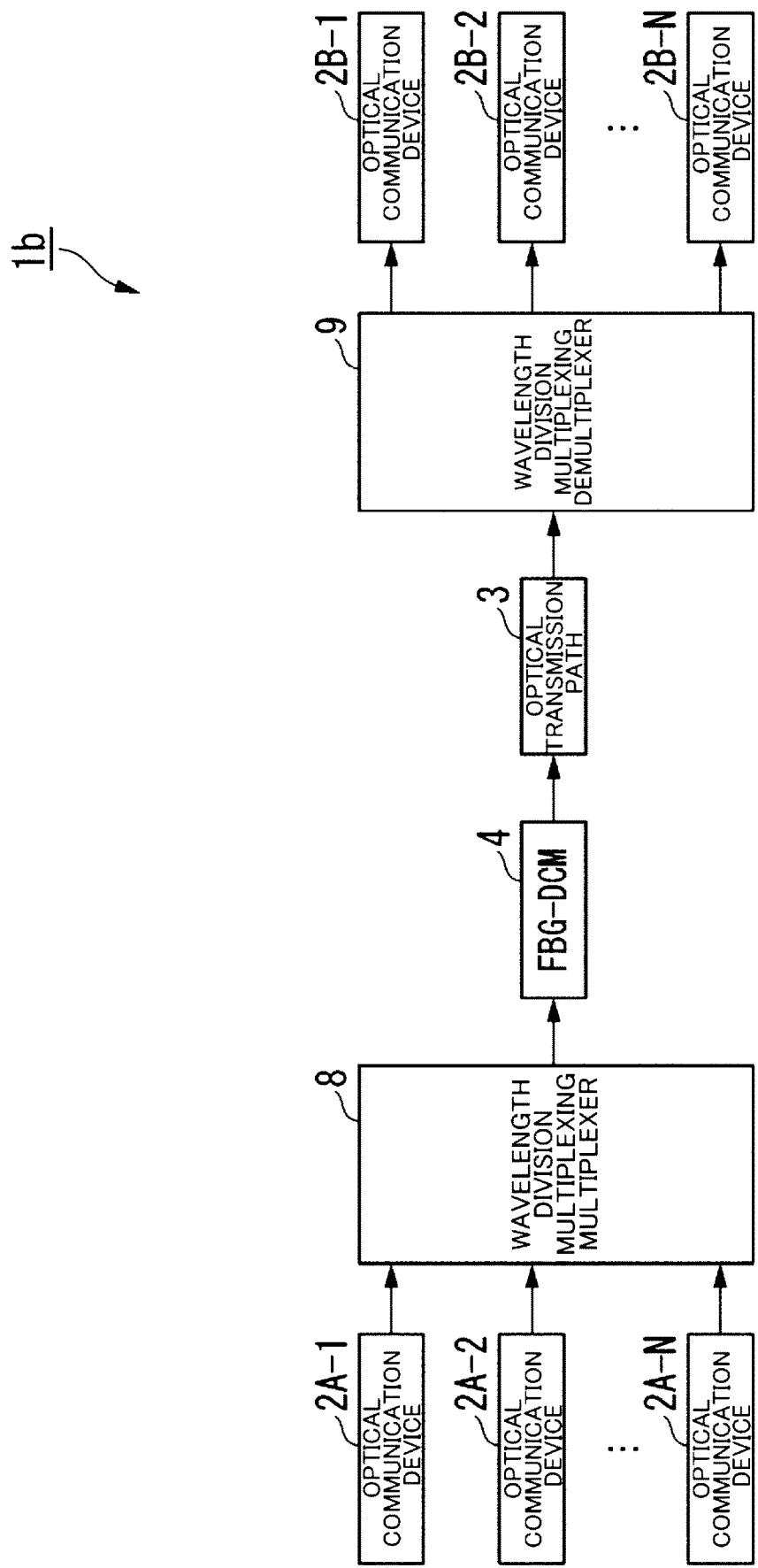
FIG. 9 is a block diagram of the configuration of an optical transmission system according to a third embodiment of the invention.

FIG. 9 is a block diagram of the configuration of an optical transmission system 1b according to a third embodiment of the invention. The elements according to the third embodiment which are the same as those of the optical transmission system 1 according to the first embodiment shown in FIG. 1 are designated by the same reference characters, and different elements will be described. The optical transmission system 1b includes N optical communication devices 2A-1, 2A-2, . . . , 2A-N, a wavelength division multiplexing multiplexer 8, an FBG-DCM 4, an optical transmission path 3, a wavelength division multiplexing demultiplexer 9, and N optical communication devices 2B-1, 2B-2, . . . , 2B-N. Here, N is an integer of two or more. The number of the optical communication devices 2A-1 to 2A-N and the number of the optical communication devices 2B-1 to 2B-N are equal.

The optical communication devices 2A-1 to 2A-N each have the same configuration as that of the optical communication device 2A according to the first embodiment. The optical communication devices 2A-1 to 2A-N each transmit optical signals with different wavelengths from each other. The optical communication devices 2B-1 to 2B-N each have the same configuration as that of the optical communication device 2B according to the first embodiment. In the following description, functional units of the optical communication devices 2A-1 to 2A-N and 2B-1 to 2B-N that correspond to the functional units of the optical communication devices 2A and 2B are designated by the reference characters of these functional units with the branch numbers. For example, the functional unit of the optical communication device 2A-1 which corresponds to the electrical signal generating unit 51 of the optical communication device 2A is indicated as an electrical signal generating unit 51-1.

The wavelength division multiplexing multiplexer 8 has N input ports and one output port. The wavelength division multiplexing multiplexer 8 is, for example, a WDM-MUX (Wavelength Division Multiplexing-Multiplexer). The N input ports of the wavelength division multiplexing multiplexer 8 are connected with the optical communication devices 2A-1 to 2A-N respectively through optical fibers. The output port of the wavelength division multiplexing multiplexer 8 is connected with the FBG-DCM 4 through the optical fiber. The wavelength division multiplexing multiplexer 8 obtains N optical signals with different wavelengths from each other output by the optical communication devices 2A-1 to 2A-N. The wavelength division multiplexing multiplexer 8 converts the N optical signals with different wavelengths from each other into optical signals with N different wavelengths. The wavelength division multiplexing multiplexer 8 multiplexes the converted optical signals with the N different wavelengths from each other. In this way, the wavelength division multiplexing multiplexer 8 generates a multiplexed signal.

The wavelength division multiplexing demultiplexer 9 includes one input port and N output ports. The wavelength division multiplexing demultiplexer 9 is, for example, a WDM-DEMUX (Wavelength Division Multiplexing-Demultiplexer). An optical transmission path 3 is connected to the input port of the wavelength division multiplexing demultiplexer 9. The N output ports of the wavelength division multiplexing demultiplexer 9 are connected with the optical communication devices 2B-1 to 2B-N through optical fibers. The wavelength division multiplexing demultiplexer 9 obtains the multiplexed signal transmitted through the optical transmission path 3. The wavelength division multiplexing demultiplexer 9 splits the obtained multiplexed signal on a wavelength basis.

The wavelength division multiplexing demultiplexer 9 outputs the N optical signals with different wavelengths from each other obtained by demultiplexing to the optical communication devices 2B-1 to 2B-N connected to the output ports. The N different wavelengths from each other are output from the output ports associated in advance. The N input ports of the wavelength division multiplexing multiplexer 8 and the N output ports of the wavelength division multiplexing demultiplexer 9 are associated in advance on a one-to-one basis. For example, assume that the first input port of the wavelength division multiplexing multiplexer 8 is associated with the first output port of the wavelength division multiplexing demultiplexer 9. In this case, the wavelength division multiplexing multiplexer 8 converts an optical signal obtained from the first input port into a signal with a prescribed wavelength. Therefore, the wavelength division multiplexing demultiplexer 9 is previously set to split the optical signal with the prescribed wavelength and output the resulting signal to the first output port.

Processing According to Third Embodiment

Figure 10:
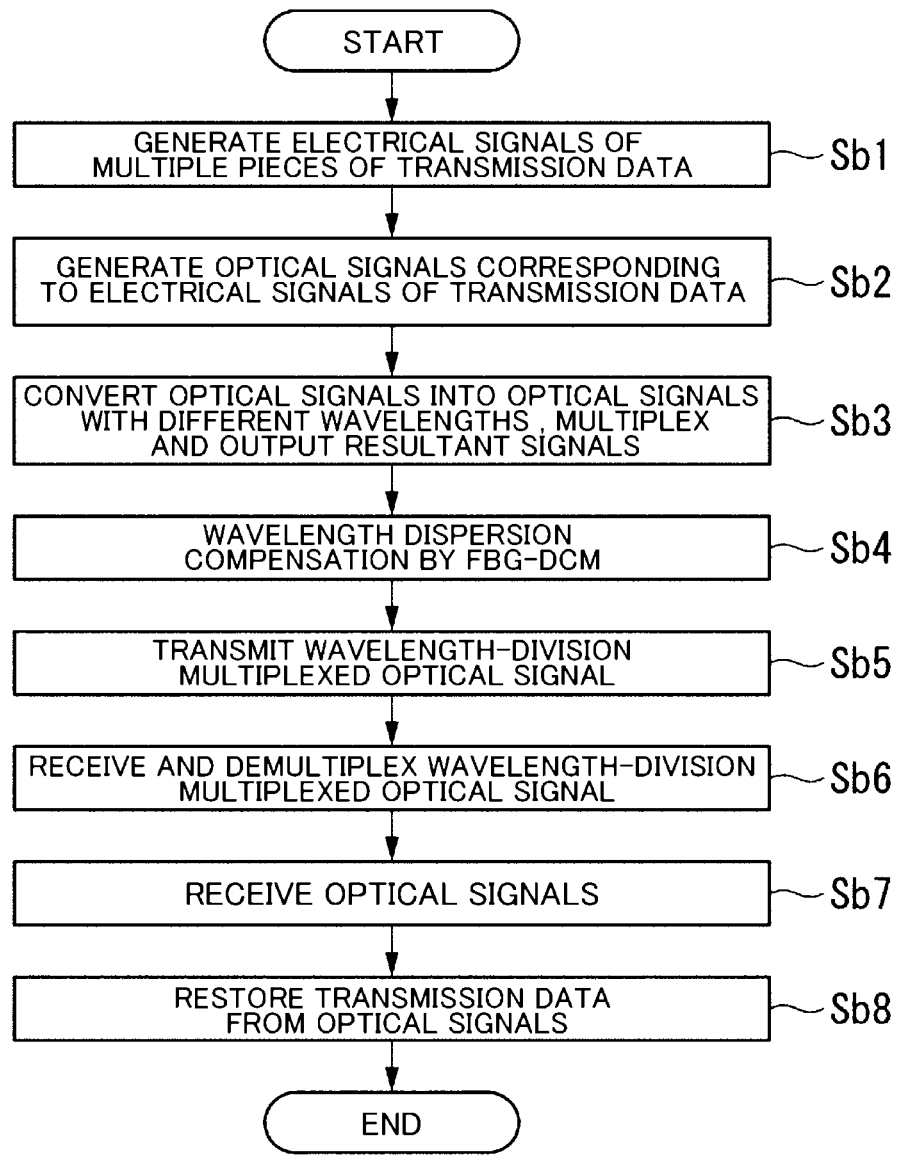
FIG. 10 is a flowchart for illustrating the flow of processing steps carried out by the optical transmission system according to the third embodiment.

FIG. 10 is a flowchart for illustrating the flow of processing steps performed by the optical transmission system 1b according to the third embodiment. The electrical signal generating units 51-1 to 51-N of the optical communication devices 2A-1 to 2A-N encode transmission data and convert the encoded transmission data into electrical signals to generate the electrical signals. The electrical signal generating units 51-1 to 51-N output the generated electrical signals of the transmission data to the optical signal generating units 52-1 to 52-N connected therewith (step Sb1).

The optical signal generating units 52-1 to 52-N obtain the electrical signals of the transmission data output by the electrical signal generating units 51-1 to 51-N. The optical signal generating units 52-1 to 52-N convert the obtained electrical signals into optical signals. In this case, the optical signal generating units 52-1 to 52-N generate optical signals with different wavelengths from each other. The optical signal generating units 52-1 to 52-N output the optical signals obtained by the conversion to the wavelength division multiplexing multiplexer 8 (step Sb2).

The wavelength division multiplexing multiplexer 8 obtains the N optical signals with the different wavelengths from each other output by the optical signal generating units 52-1 to 52-N. The wavelength division multiplexing multiplexer 8 converts the N optical signals with the different wavelengths from each other into optical signals with different N wavelengths from each other. The wavelength division multiplexing multiplexer 8 multiplexes the converted optical signals with the N different wavelengths to generate a multiplexed signal. The wavelength division multiplexing multiplexer 8 outputs the generated multiplexed signal to the FBG-DCM 4 (step Sb3). The FBG-DCM 4 obtains the multiplexed signal. The FBG-DCM 4 performs wavelength dispersion compensation on the obtained multiplexed signal. The FBG-DCM 4 outputs the multiplexed signal after the wavelength dispersion compensation to the optical transmission path 3 (step Sb4). The multiplexed signal transmitted from the FBG-DCM 4 is input to the wavelength division multiplexing demultiplexer 9 through the optical transmission path 3 (step Sb5).

The wavelength division multiplexing demultiplexer 9 receives the input multiplexed signal. The wavelength division multiplexing demultiplexer 9 splits the received multiplexed signal on a wavelength-basis. The wavelength division multiplexing demultiplexer 9 outputs the N optical signals obtained by the demultiplexing from the output ports associated with the wavelengths of the N optical signals to the optical communication devices 2B-1 to 2B-N (step Sb6).

The optical signal receiving units 61-1 to 61-N receive and obtain the optical signals output by the wavelength division multiplexing demultiplexer 9. The optical signal receiving units 61-1 to 61-N convert the obtained optical signals into electrical signals and output the signals to the electrical signal processing units 62-1 to 62-N (step Sb7). The electrical signal processing units 62-1 to 62-N obtain the electrical signals output by the optical signal receiving units 61-1 to 61-N. The electrical signal processing units 62-1 to 62-N decode the obtained electrical signals and restore the transmission data (step Sb8).

Another Exemplary Configuration According to Third Embodiment

Figure 11:
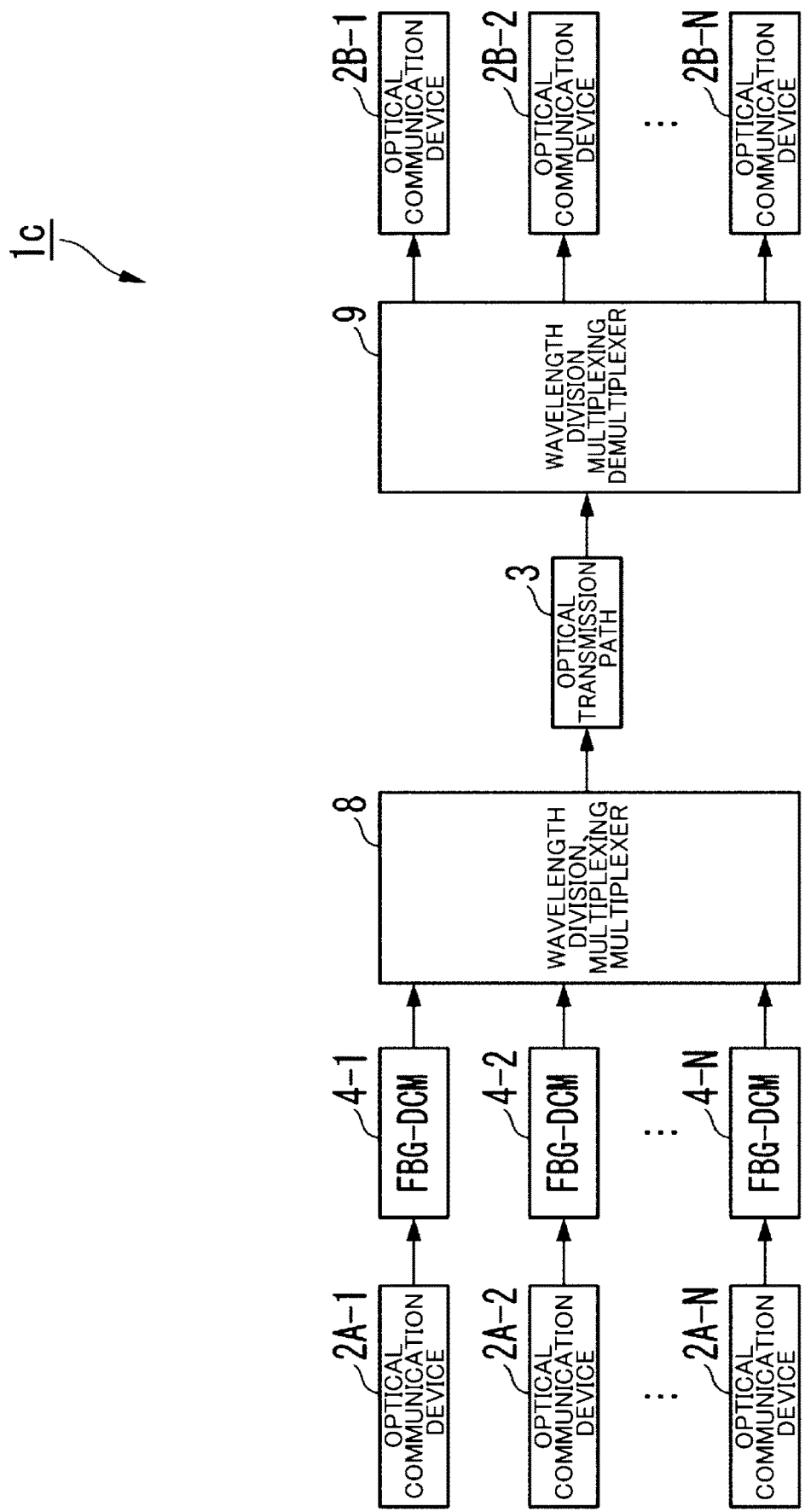
FIG. 11 is a block diagram of another exemplary configuration according to the third embodiment.

FIG. 11 is a block diagram of the configuration of an optical transmission system 1c as another exemplary configuration according to the third embodiment. In FIG. 11, the same elements as those of the optical transmission system 1b shown in FIG. 9 are designated by the same reference characters, and different elements will be described.

The optical transmission system 1c includes optical communication devices 2A-1 to 2A-N, N optical communication devices 2B-1 to 2B-N, an optical transmission path 3, N FBG-DCMs 4-1 to 4-N, a wavelength division multiplexing multiplexer 8 and a wavelength division multiplexing demultiplexer 9.

The N FBG-DCMs 4-1 to 4-N are connected, through optical fibers, to the optical communication devices 2A-1 to 2A-N and the N ports of the wavelength division multiplexing multiplexer 8. In the optical transmission system 1c, the optical signals with different wavelengths from one another output by the optical communication devices 2A-1 to 2A-N are individually compensated for wavelength dispersion. The wavelength division multiplexing multiplexer 8 obtains the N wavelength-dispersion compensated optical signals with different wavelengths from one another. The wavelength division multiplexing multiplexer 8 converts the N obtained optical signals with different wavelengths from one another into optical signals with different wavelengths from one another. The wavelength division multiplexing multiplexer 8 multiplexes the converted optical signals and outputs the resulting signal to the optical transmission path 3.

In the optical transmission system 1b and the optical transmission system 1c in the other exemplary configuration described above according to the third embodiment, the wavelength division multiplexing multiplexer 8 is connected to the plurality of optical communication devices 2A-1 to 2A-N and generates a multiplexed signal by wavelength division multiplexing the plurality of optical signals with different wavelengths from one another output by the optical communication devices 2A-1 to 2A-N. The wavelength division multiplexing multiplexer 8 outputs the generated multiplexed signal to the optical transmission path 3. The wavelength division multiplexing demultiplexer 9 is connected to the plurality of optical communication devices 2B-1 to 2B-N. The wavelength division multiplexing demultiplexer 9 receives the multiplexed signal output by wavelength division multiplexing multiplexer 8. The wavelength division multiplexing demultiplexer 9 splits the received multiplexed signal on a wavelength basis and outputs the resulting signals to the plurality of optical communication devices 2B-1 to 2B-N.

In the optical transmission systems 1b and 1c, the FBG-DCM 4 is inserted between the wavelength division multiplexing multiplexer 8 and the optical transmission path 3, receives the optical signals output by the wavelength division multiplexing multiplexer 8, performs wavelength dispersion compensation on the received optical signals, and outputs the resulting signals to the optical transmission path 3. Alternatively, a plurality of FBG-DCMs 4-1 to 4-N is inserted between the plurality of optical communication devices 2A-1 to 2A-N and the wavelength division multiplexing multiplexer 8 and receive the optical signals output by the optical communication devices 2A-1 to 2A-N, perform wavelength dispersion compensation on the received optical signals, and output the resulting signals to the wavelength division multiplexing multiplexer 8.

Since the FBG-DCM 4 or the FGB-DCMs 4-1 to 4-N are inserted, waveform distortion attributable to wavelength dispersion can be compensated while reducing non-linear optical effects when the transmission power of the optical signal is increased. In particular, since the FBG-DCM has a limited wavelength range for wavelength dispersion compensation, the compensation effect can be increased by individually carrying out wavelength dispersion compensation rather than carrying out wavelength dispersion compensation on the waveform multiplexed signals together at a time. Since the power of the transmission optical signals can be increased, the OSNR can be improved. Therefore, the quality of received signals can be improved and the transmission distance can be increased. In the optical transmission systems 1b and 1c, the FBG-DCMs 4 and 4-1 to 4-N are inserted in positions closer to the optical communication devices 2A-1 to 2A-N, so that optical signals can be transmitted with greater transmission power, which can further improve the quality of received signals.

Fourth Embodiment

Figure 12:
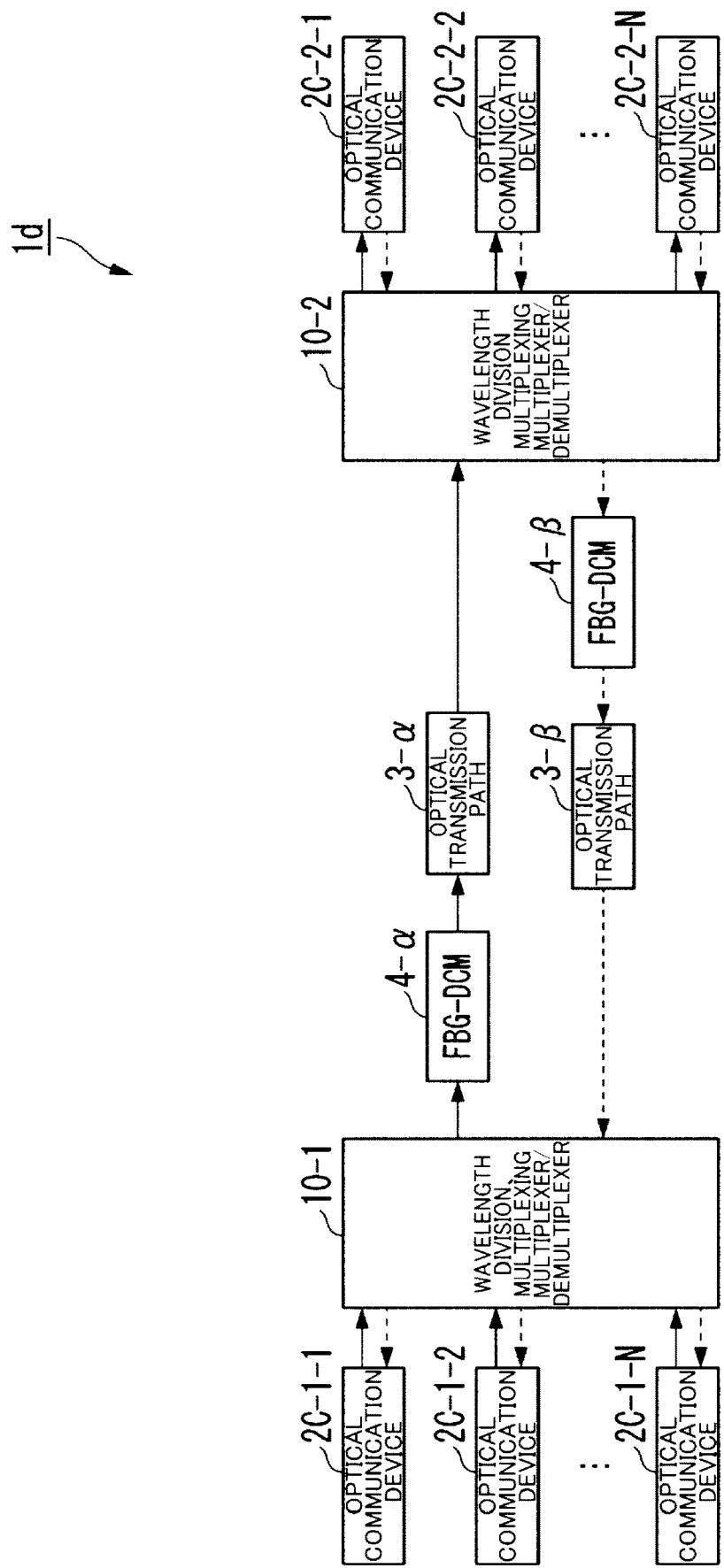
FIG. 12 is a block diagram of the configuration of an optical transmission system according to a fourth embodiment of the invention.

FIG. 12 is a block diagram of the configuration of an optical transmission system 1d according to a fourth embodiment of the invention. According to the fourth embodiment, the same elements as those of the optical transmission system 1a according to the second embodiment shown in FIG. 6 and the optical transmission system 1b according to the third embodiment shown in FIG. 9 are designated by the same reference characters, and different elements will be described.

The optical transmission system 1d includes N optical communication devices 2C-1-1, 2C-1-2, . . . , 2C-1-N, wavelength division multiplexing multiplexer/demultiplexers 10-1 and 10-2, N optical communication devices 2C-2-1, 2C 2, . . . , 2C-2-N, optical transmission paths 3-α and 3-β, and FBG-DCMs 4-α and 4-β.

The optical communication devices 2C-1-1 to 2C-1-N have the same configuration as the optical communication device 2C-1 according to the second embodiment. The optical communication devices 2C-1-1 to 2C-1-N output optical signals with different wavelengths from one another. The optical communication devices 2C-2-1 to 2C-2-N have the same configuration as the optical communication device 2C-2 according to the second embodiment. The optical communication devices 2C-2-1 to 2C-2-N output optical signals with different wavelengths from one another. The optical communication devices 2C-1 and 2C-2 according to the second embodiment have the same configuration, and therefore the optical communication devices 2C-1-1 to 2C-1-N and 2C-2-1 to 2C-2-N have the same configuration. In the following description, the functional units of the optical communication devices 2C-1-1 to 2C-1-N and 2C-2-1 to 2C-2-N which correspond to the functional units of the optical communication devices 2C-1 and 2C-2 are designated by the same reference characters followed by branch numbers. For example, the functional unit of the optical communication device 2C-1-1 which corresponds to the optical transmitting/receiving unit 7-1 of the optical communication device 2C-1 is indicated as an optical transmitting/receiving unit 7-1-1.

Figure 13:
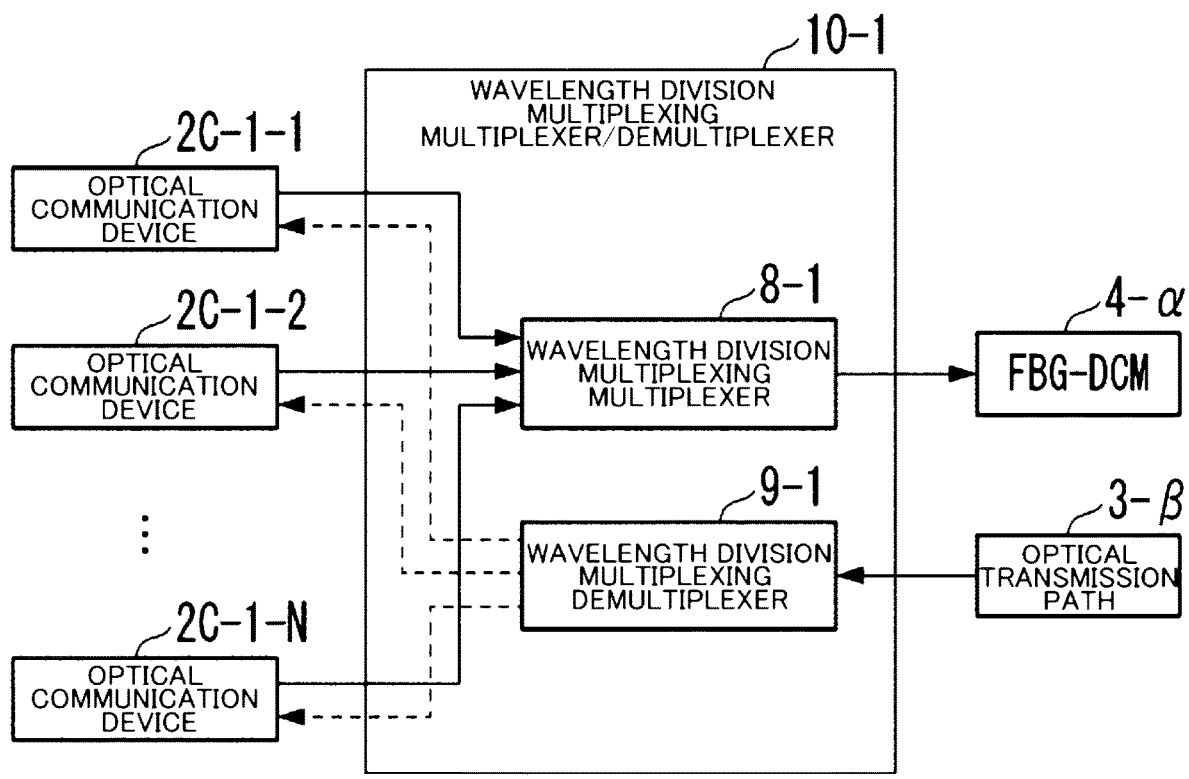
FIG. 13 is a block diagram illustrating the internal configuration and the connections of a waveform division multiplexing multiplexer/demultiplexer according to the fourth embodiment.

The wavelength division multiplexing multiplexer/demultiplexer 10-1 includes a wavelength division multiplexing multiplexer 8-1 and a wavelength division multiplexing demultiplexer 9-1 as shown in FIG. 13. The wavelength division multiplexing multiplexer 8-1 has the same configuration as the wavelength division multiplexing multiplexer 8 according to the third embodiment. The wavelength division multiplexing demultiplexer 9-1 has the same configuration as the wavelength division multiplexing demultiplexer 9 according to the third embodiment.

The N input ports of the wavelength division multiplexing multiplexer 8-1 are connected with the optical signal generating units 52-1-1 to 52-1-N of the optical communication devices 2C-1-1 to 2C-1-N. The output port of the wavelength division multiplexing multiplexer 8-1 is connected with the FBG-DCM 4-α.

The input port of the wavelength division multiplexing demultiplexer 9-1 is connected with the optical transmission path 3-β. The N output ports of the wavelength division multiplexing demultiplexer 9-1 are connected with the optical signal receiving units 61-1-1 to 61-1-N of the optical communication devices 2C-1-1 to 2C-1-N.

The wavelength division multiplexing multiplexer/demultiplexer 10-2 has the same configuration as the wavelength division multiplexing multiplexer/demultiplexer 10-1 and includes the wavelength division multiplexing multiplexer 8-2 corresponding to the wavelength division multiplexing multiplexer 8-1 and the wavelength division multiplexing demultiplexer 9-1 corresponding to the wavelength division multiplexing demultiplexer 9-2.

The N input ports of the wavelength division multiplexing multiplexer 8-2 are connected with the optical signal generating units 52-2-1 to 52-2-N of the optical communication devices 2C-2-1 to 2C-2-N. The FBG-DCM 4-β is connected to the output port of the wavelength division multiplexing multiplexer 8-2.

The input port of the wavelength division multiplexing demultiplexer 9-2 is connected with the optical transmission path 3-α. The N output ports of the wavelength division multiplexing demultiplexer 9-2 are connected with the optical signal receiving units 61-2-1 to 61-2-N of the optical communication devices 2C-2-1 to 2C-2-N.

The optical signal generating units 52-1-1 to 52-1-N of the optical communication devices 2C-1-1 to 2C-1-N are connected to the wavelength division multiplexing multiplexer 8-1 of the wavelength division multiplexing multiplexer/demultiplexer 10-1, to the wavelength division multiplexing demultiplexer 9-2 of wavelength division multiplexing multiplexer/demultiplexer 10-2 through the FBG-DCM 4-α and the optical transmission path 3-α, and to the optical signal receiving units 61-2-1 to 61-2-N of the optical communication devices 2C-2-1 to 2C-2-N through the wavelength division multiplexing demultiplexer 9-2. The paths formed by these connections serve as transmission paths shown in solid lines from the optical communication devices 2C-1-1 to 2C-1-N to the optical communication devices 2C-2-1 to 2C-2-N.

The optical signal generating units 52-2-1 to 52-2-N of the optical communication devices 2C-2-1 to 2C-2-N are connected to the wavelength division multiplexing multiplexer 8-2 of the wavelength division multiplexing multiplexer/demultiplexer 10-2, to the wavelength division multiplexing demultiplexer 9-1 of the wavelength division multiplexing multiplexer/demultiplexer 10-1 through the FBG-DCM 4-β and the optical transmission path 3-β, and to the optical signal receiving unit 61-1-1 to 61-1-N of the optical communication devices 2C-1-1 to 2C-1-N through the wavelength division multiplexing demultiplexer 9-1. The paths formed by these connections serve as the transmission paths shown in dashed lines from the optical communication devices 2C-2-1 to 2C-2-N to the optical communication devices 2C-1-1 to 2C-1-N.

Therefore, the optical transmission system 1d according to the fourth embodiment performs the same processing as that carried out by the optical transmission system 1b according to the third embodiment shown in FIG. 10 by the combination of the electrical signal generating units 51-1-1 to 51-1-N and the optical signal generating units 52-1-1 to 52-1-N of the optical communication devices 2C-1-1 to 2C-1-N and the combination of the wavelength division multiplexing multiplexer 8-1 of the wavelength division multiplexing multiplexer/demultiplexer 10-1, the FBG-DCM 4-α, the optical transmission path 3-α, and the wavelength division multiplexing demultiplexer 9-2 of the wavelength division multiplexing multiplexer/demultiplexer 10-2, and the optical signal receiving units 61-2-1 to 61-2-N and the electrical signal processing units 62-2-1 to 62-2-N of the optical communication devices 2C-2-1 to 2C-2-N.

The optical transmission system 1*d* according to the fourth embodiment performs the same processing as that carried out by the optical transmission system 1B according to the third embodiment shown in FIG. 10 by the combination of the electrical signal generating units 51-2-1 to 51-2-N and the optical signal generating units 52-1-2 to 52-2-N of the optical communication devices 2C-2-1 to 2C-2-N and the combination of the wavelength division multiplexing multiplexer 8-2 of the wavelength division multiplexing multiplexer/demultiplexer 10-2, the FBG-DCM 4-β, the optical transmission path 3-β, the wavelength division multiplexing demultiplexer 9-1 of the wavelength division multiplexing multiplexer/demultiplexer 10-1, and the optical signal receiving units 61-1-1 to 61-1-N and the electrical signal processing units 62-2-1 to 62-2-N of the optical communication devices 2C-1-1 to 2C-1-N.

Another Exemplary Configuration According to Fourth Embodiment

Figure 14:
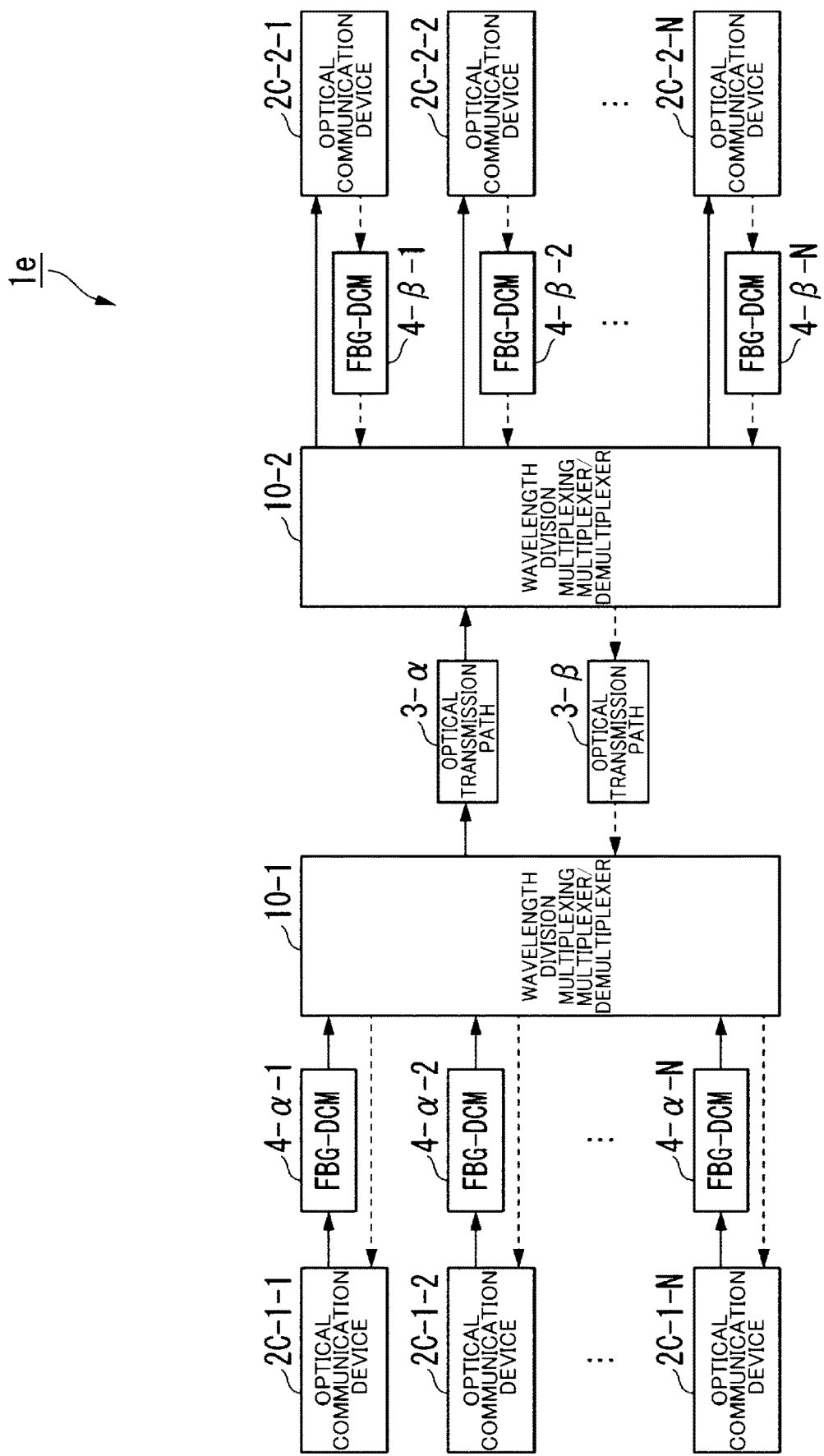
FIG. 14 is a block diagram of another exemplary configuration according to the fourth embodiment.
Figure 15:
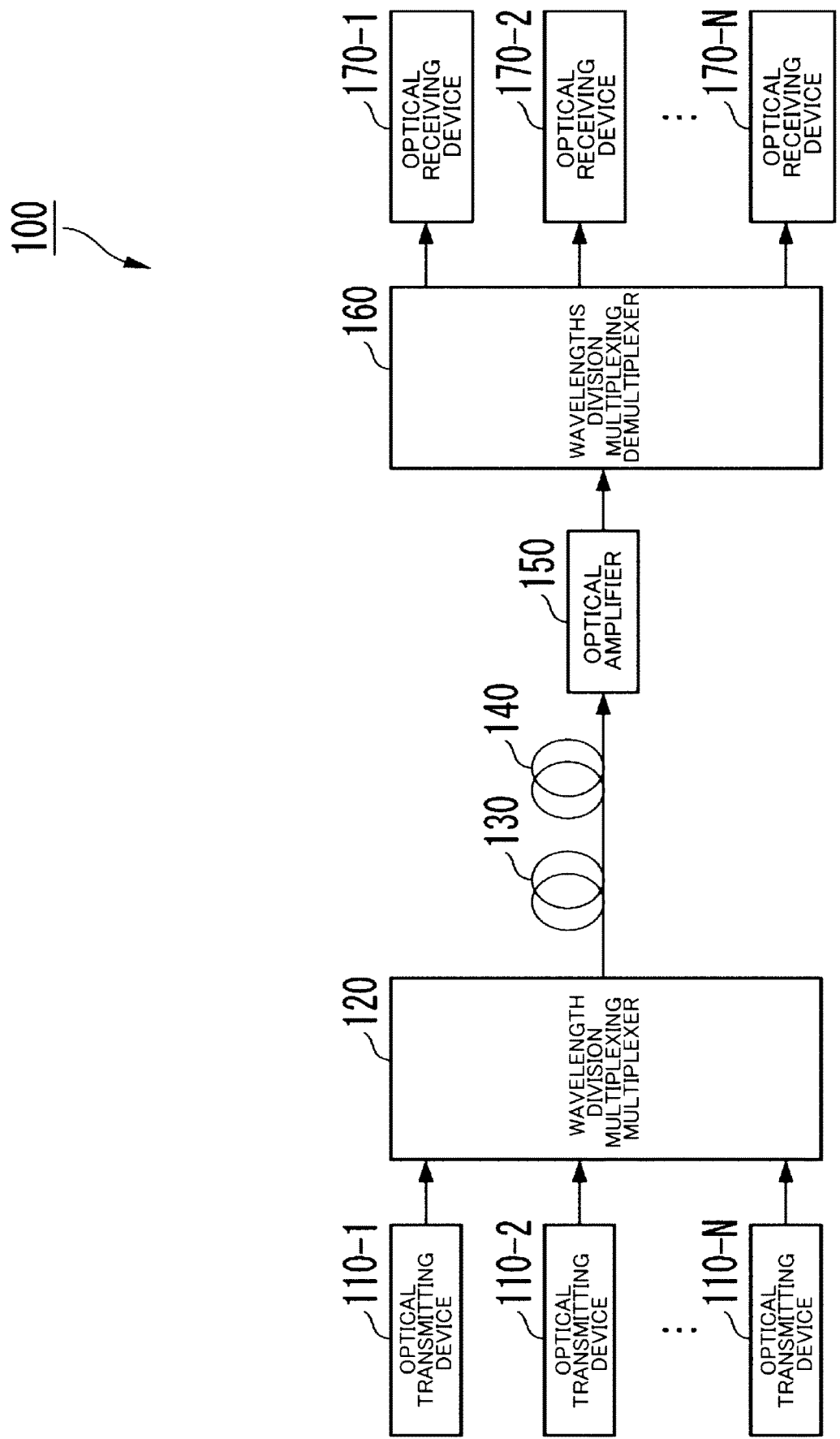
FIG. 15 is a block diagram (third case) of the configuration of an optical transmission system including a DCF.

FIG. 14 is a block diagram of the configuration of an optical transmission system 1*e* as another exemplary configuration according to the fourth embodiment. In FIG. 14, the same elements as those of the optical transmission system 1*d* shown in FIG. 12 are designated by the same reference characters, and different elements will be described.

The optical transmission system 1*e* includes optical communication devices 2C-1-1 to 2C-1-N, N optical communication devices 2C-2-1 to 2C-2-N, and optical transmission paths 3*a* and 313, N FBG-DCMs 4-α-1 to 4-α-N, N FBG-DCMs 4-β-1 to 4-β-N, and wavelength division multiplexing multiplexer/demultiplexers 10-1 and 10-2.

The N FBG-DCMs 4-α-1 to 4-α-N are connected to the optical signal generating units 52-1-1 to 52-1-N of the optical communication devices 2C-1-1 to 2C-1-N and the N ports of the wavelength division multiplexing multiplexer 8-1 of the wavelength division multiplexing multiplexer/demultiplexer 10-1 through optical fibers.

The N FBG-DCMs 4-β-1 to 4-β-N are connected to the optical signal generating units 52-2-1 to 52-2-N of the optical communication devices 2C-2-1 to 2C-2-N and the N ports of the wavelength division multiplexing multiplexer 8-2 of the wavelength division multiplexing multiplexer/demultiplexer 10-2 through optical fibers.

In the optical transmission system 1*e*, the FBG-DCMs 4-α-1 to 4-α-N individually perform wavelength dispersion compensation on optical signals with different wavelengths from one another output by the optical communication devices 2C-1-1 to 2C-1-N. The wavelength division multiplexing multiplexer 8-1 of the wavelength division multiplexing multiplexer/demultiplexer 10-1 obtains the N wavelength dispersion compensated optical signals with different wavelengths from one another. The wavelength division multiplexing multiplexer 8-1 converts the N obtained optical signals with different wavelengths from one another into optical signals with different wavelengths from one another. The wavelength division multiplexing multiplexer 8-1 multiplexes the optical signals obtained by the conversion and outputs the resulting signal to the optical transmission path 3-α.

In the optical transmission system 1*e*, the optical signal generating units 52-2-1 to 52-2-N of the optical communication devices 2C-2-1 to 2C-2-N output optical signals with different wavelengths from one another. The FBG-DCMs 4-β-1 to 4-β-N individually compensate for the wavelength dispersion of the optical signals with the different wavelengths. The wavelength division multiplexing multiplexer 8-2 of the wavelength division multiplexing multiplexer/demultiplexer 10-2 obtains the N wavelength dispersion compensated optical signals with the different wavelengths from one another. The wavelength division multiplexing multiplexer 8-2 converts the N obtained optical signals with the different wavelengths from one another into optical signals with different wavelengths from one another. The wavelength division multiplexing multiplexer 8-2 multiplexes the converted optical signals and outputs the resulting signal to the optical transmission path 3-β.

In the optical transmission system 1*d* and the optical transmission system 1*e* according to the other exemplary configuration according to the fourth embodiment described above, the wavelength division multiplexing multiplexer 8-1 is connected to the plurality of optical communication devices 2C-1-1 to 2C-1-N to perform the wavelength division multiplexing of a plurality of optical signals output by the optical communication devices 2C-1-1 to 2C-1-N and output the resulting signal. The wavelength division multiplexing multiplexer 8-2 is connected to the plurality of optical communication devices 2C-2-1 to 2C-2-N to perform the wavelength division multiplexing of a plurality of optical signals output by the devices 2C-2-1 to 2C-2-N and output the resulting signal. The wavelength division multiplexing demultiplexer 9-1 is connected to the plurality of optical communication devices 2C-1-1 to 2C-1-N. The wavelength division multiplexing demultiplexer 9-1 receives the multiplexed signal output by the wavelength division multiplexing multiplexer 8-2. The wavelength division multiplexing demultiplexer 9-1 splits the received multiplexed signal on a wavelength-basis and outputs the resulting signals to the plurality of optical communication devices 2C-1-1 to 2C-1-N. The wavelength division multiplexing demultiplexer 9-2 is connected to the plurality of optical communication devices 2C-2-1 to 2C-2-N. The wavelength division multiplexing demultiplexer 9-2 receives the multiplexed signal output by wavelength division multiplexing multiplexer 8-1. The wavelength division multiplexing demultiplexer 9-2 splits the received multiplexed signal on a wavelength-basis and outputs the resulting signals to the plurality of optical communication devices 2C-2-1 to 2C-2-N.

In the optical transmission system 1*d*, the FBG-DCM 4-α is inserted between the wavelength division multiplexing multiplexer 8-1 of the wavelength division multiplexing multiplexer/demultiplexer 10-1 and the optical transmission path 3-α to receive the optical signal output by the wavelength division multiplexing multiplexer 8-1. The FBG-DCM 4-α performs wavelength dispersion compensation on the received optical signal and outputs the resulting signal to the optical transmission path 3-α. The FBG-DCM 4-β is inserted between the wavelength division multiplexer 8-2 and the optical transmission path 3-13 to receive the optical signal output by the wavelength division multiplexer 8-2. The FBG-DCM 4-β performs wavelength dispersion compensation on the received optical signal and sends the resulting signal to the optical transmission path 3-β.

In the optical transmission system 1*e*, the plurality of FBG-DCMs 4-α-1 to 4-α-N is inserted between the plurality of optical communication devices 2C-1-1 to 2C-1-N and the wavelength division multiplexing multiplexer 8-1 of the wavelength division multiplexing multiplexer/demultiplexer 10-1 to receive the optical signals output by the optical communication devices 2C-1-1 to 2C-1-N. The plurality of FBG-DCMs 4-α-1 to 4-α-N performs wavelength dispersion compensation on the received optical signals and output the resulting signals to the wavelength division multiplexing multiplexer 8-1. The plurality of FBG-DCMs 4-β-1 to 4-β-N is inserted between the plurality of optical communication devices 2C-2-1 to 2C-2-N and the wavelength division multiplexing multiplexer 8-2 to receive optical signals output by the optical communication devices 2C-2-1 to 2C-2-N. The plurality of FBG-DCMs 4-β-1 to 4-β-N performs wavelength dispersion compensation on the received optical signals and output the resulting signals to the wavelength division multiplexing multiplexer 8-2.

Since the FBG-DCMs 4-α, 4-α-1 to 4-α-N, 4-β, and 4-β-1 to 4-β-N are inserted, waveform distortion attributable to wavelength dispersion can be compensated while reducing nonlinear optical effects when the power of the optical signals transmitted by the optical communication devices 2C-1-1 to 2C-1-N and 2C-2-1 to 2C-2-N are increased. In particular, since the FBG-DCM has a limited wavelength range for wavelength dispersion compensation, the compensation effect can be improved by performing wavelength dispersion compensation on each individual signal to improve the compensation effect rather than performing wavelength dispersion compensation on a wavelength division multiplexed optical signal at a time. Since the optical communication devices 2C-1-1 to 2C-1-N and 2C-2-1 to 2C-2-N can increase the power of the optical signals to be transmitted, the OSNR can be improved. As a result, the quality of received signals can be improved and the transmission distance can be increased. The FBG-DCMs 4-α, 4-α-1 to 4-α-N, 4-β, and 4-β-1 to 4-β-N are inserted in positions closer to the optical signal generating units 52-1-1 to 52-1-N of the optical communication devices 2C-1-1 to 2C-1-N and the optical signal generating units 52-2-1 to 52-2-N of the optical communication devices 2C-2-1 to 2C-2-N, so that the optical signals can be transmitted with greater transmission power, which can further improve the quality of received signals.

Note that in the section including the FBG-DCM 4-α, the optical transmission path 3-α, the FBG-DCM 4-β, and the optical transmission path 3-β in the optical transmission system 1a according to the second embodiment and the optical transmission system 1d according to the fourth embodiment and in the section including the optical transmission paths 3-α and 3-13 in the optical transmission system 1e as the other exemplary configuration according to the fourth embodiment, the path shown in solid lines and the path shown in dashed lines may be a path multiplexed with different wavelengths in a single optical fiber path rather than as two physically different paths.

In the case of the optical transmission system 1a according to the second embodiment, a configuration for wavelength multiplexing and splitting is required. Therefore, for example, in the optical transmission system 1d according to the fourth embodiment, instead of the N optical communication devices 2C-1-1 to 2C-1-N, one optical communication device 2C-1 must be connected to the wavelength division multiplexing multiplexer/demultiplexer 10-1, and instead of the N optical communication devices 2C-2-1 to 2C-2-N, one optical communication device 2C-2 must be connected to the wavelength division multiplexing multiplexer/demultiplexer 10-2.

In order to provide paths with different wavelengths, the wavelength division multiplexing multiplexer/demultiplexers 10-1 and 10-2 are configured to allocate different wavelengths to the paths from the wavelength division multiplexing multiplexer 8-1 of the wavelength division multiplexing multiplexer/demultiplexer 10-1 to the wavelength division multiplexing demultiplexer 9-2 of the wavelength division multiplexing multiplexer/demultiplexer 10-2 and from the wavelength division multiplexing multiplexer 8-2 of the wavelength division multiplexing multiplexer/demultiplexer 10-2 to the wavelength division multiplexing demultiplexer 9-1 of the wavelength division multiplexing multiplexer/demultiplexer 10-1.

In order to perform wavelength division multiplexing for each transmission/reception path in a single optical fiber path, the FBG-DCM 4-α performs wavelength dispersion compensation on optical signals generated by the optical signal generating units 52-1 and 52-1-1 to 52-1-N of the optical communication devices 2C-1 and 2C-1-1 to 2C-1-N. Then, the FBG-DCM 4-β performs wavelength dispersion compensation on optical signals generated by the optical signal generating units 52-2 and 52-2-1 to 52-2-N of the optical communication devices 2C-2 and 2C-2-1 to 2C-2-N.

In the optical transmission systems 1, 1a, 1b, 1c, 1d, and 1e according to the first to fourth embodiments described above, an external measurement device may be connected in the optical communication devices 2B, 2C-1, 2C-2, 2B-1 to 2B-N, 2C-1-1 to 2C-1-N, and 2C-2-1 to 2C-2-N on the receiving side, so that the user can check the quality of received signals. The optical communication devices 2B, 2C-1, 2C-2, 2B-1 to 2B-N, 2C-1-1 to 2C-1-N, and 2C-2-1 to 2C-2-N on the receiving side may detect the quality of received signals and provide feedback on the result to the transmitting side. In this way, the user can check changes in the quality of received signals before and after the insertion of the FBG-DCMs 4, 4-1 to 4-N, 4-α, 4-β, 4-α-1 to 4-α-N, and 4-β-1 to 4-β-N.

The optical communication devices 2A, 2B, 2A-1 to 2A-N, 2B-1 to 2B-N, 2C-1, 2C-2, 2C-1-1 to 2C-1-N, 2C-2-1 to 2C-2-N according to the above-described embodiments may be implemented by computers. In such a case, the program to realize their functions may be recorded on a computer-readable recording medium, and the program recorded on the recording medium may be read and executed by the computer system. The term "computer system" herein includes the OS and hardware such as peripheral devices.

The "computer-readable recording medium" refers to a portable medium such as a flexible disk, an optical magnetic disk, a ROM, and a CD-ROM, and other storage devices such as a hard disk which are built in a computer system. The "computer-readable recording medium" may also include an element for dynamically retaining a program for a short period of time such as a communication line when the program is transmitted over a network such as the Internet or a communication line such as a telephone line, or an element for retaining a program for a prescribed time period such as a volatile memory inside a server or a computer system that serves as client in that case. The program may be used to implement some of the above-described functions or may also be combined with a program already recorded in the computer system to implement the above-mentioned functions or a programmable logic device such as an FPGA (Field Programmable Gate Array) may be used to implement the functions.

The embodiments of the invention have been described in detail with reference to the drawings, but the specific configurations are not limited by the embodiments, and designs and the like within the gist of the invention are encompassed by the invention.

INDUSTRIAL APPLICABILITY

The present invention is applicable to long-distance optical fiber communication with wavelength dispersion.

REFERENCE SIGNS LIST

1 Optical transmission system
2A, 2B Optical communication device
3 Optical transmission path
4 FBG-DCM
5 Optical transmitting unit
6 Optical receiving unit
31 Optical fiber
32 Optical amplifier
51 Electrical signal generating unit
52 Optical signal generating unit
61 Optical signal receiving unit
62 Electrical signal processing unit

The invention claimed is:

1. An optical transmission system, comprising:
a first optical communication device configured to output an optical signal;
a first fiber bragg gratings-based continuous Dispersion Compensation Modules (FBG-DCM) configured to perform wavelength dispersion compensation on the optical signal output by the first optical communication device; and
a second optical communication device configured to receive the optical signal wavelength-dispersion compensated by the first FBG-DCM through a first optical transmission path of an optical fiber,
wherein the second optical communication device is configured to detect a received signal quality based on the received optical signal wavelength-dispersion compensated and provide feedback on the detected information on the received signal quality to the first optical communication device,
wherein a plurality of the first optical communication devices and a plurality of the second optical communication devices are provided, the optical transmission system further comprising:
a wavelength division multiplexing multiplexer configured to output a multiplexed signal obtained by wavelength division multiplexing a plurality of optical signals output by the plurality of the first optical communication devices;
a wavelength division multiplexing demultiplexer configured to split the multiplexed signal on a wavelength basis and outputs resulting signals to a plurality of the second optical communication devices,
wherein a plurality of first FBG-DCMs performs wavelength dispersion compensation on the plurality of optical signals output by the plurality of the first optical communication devices and then outputs, to the wavelength division multiplexing multiplexer, the plurality of optical signals after the wavelength dispersion compensation.

2. An optical transmission system, comprising:
a first optical communication device configured to output an optical signal;
a first fiber bragg gratings-based continuous Dispersion Compensation Modules (FBG-DCM) configured to perform wavelength dispersion compensation on the optical signal output by the first optical communication device; and
a second optical communication device configured to receive the optical signal wavelength-dispersion compensated by the first FBG-DCM through a first optical transmission path of an optical fiber,
wherein the second optical communication device is configured to detect a received signal quality based on the received optical signal wavelength-dispersion compensated and provide feedback on the detected information on the received signal quality to the first optical communication device,
wherein a plurality of the first optical communication devices and a plurality of the second optical communication devices are provided, the optical transmission system further comprising:
a wavelength division multiplexing multiplexer configured to output a multiplexed signal obtained by wavelength division multiplexing a plurality of optical signals output by the plurality of the first optical communication devices;
a wavelength division multiplexing demultiplexer configured to split the multiplexed signal on a wavelength basis and outputs resulting signals to a plurality of the second optical communication devices, wherein
the first FBG-DCM performs wavelength dispersion compensation on the multiplexed signal output by the wavelength division multiplexing multiplexer and then outputs, to the first optical transmission path, the multiplexed signal after the wavelength dispersion compensation or a plurality of first FBG-DCMs performs wavelength dispersion compensation on the plurality of optical signals output by the plurality of the first optical communication devices and then outputs, to the wavelength division multiplexing multiplexer, the plurality of optical signals after the wavelength dispersion compensation,
further comprising a second FBG-DCM, wherein
the second optical communication device outputs an optical signal,
the second FBG-DCM performs wavelength dispersion compensation on the optical signal output by the second optical communication device, and
the first optical communication device receives the optical signal wavelength-dispersion compensated by the second FBG-DCM through a second optical transmission path of an optical fiber, wherein a plurality of the first optical communication devices and the plurality of the second optical communication devices are provided, the optical transmission system further comprising:
a first wavelength division multiplexing multiplexer configured to output a first multiplexed signal obtained by wavelength division multiplexing a plurality of optical signals with different wavelengths from one another output by the plurality of the first optical communication devices;
a second wavelength division multiplexing multiplexer configured to output a second multiplexed signal obtained by wavelength division multiplexing a plurality of optical signals with different wavelengths from one another output by the plurality of second optical communication devices;
a first wavelength division multiplexing demultiplexer configured to split the second multiplexed signal on a wavelength-basis and outputs the resulting signals to the plurality of the first optical communication devices; and
a second wavelength division multiplexing demultiplexer configured to split the first multiplexed signal on a wavelength-basis and outputs the resulting signals to the plurality of second optical communication devices, wherein
the plurality of first FBG-DCMs performs wavelength dispersion compensation on optical signals with different wavelengths from one another output by the plurality of the first optical communication devices and outputs the resulting signals to the first wavelength division multiplexing multiplexer, and a plurality of second FBG-DCMs performs wavelength dispersion compensation on optical signals with different wavelengths from one another output by the plurality of second optical communication devices and output the resulting signals to the second wavelength division multiplexing multiplexer.

3. An optical transmission method in an optical transmission system comprising a first optical communication device, a second optical communication device, and a first fiber bragg gratings-based continuous Dispersion Compensation Modules (FBG-DCM), further comprising:

outputting, by the first optical communication device, an optical signal;

performing, by the first FBG-DCM, wavelength dispersion compensation on the optical signal output by the first optical communication device;

receiving, by the second optical communication device, the optical signal wavelength-dispersion compensated by the first FBG-DCM through a first transmission path of an optical fiber;

detecting, by the second optical communication device, a received signal quality based on the received optical signal wavelength-dispersion compensated; and providing, by the second optical communication device, feedback on the detected information on the received signal quality to the first optical communication device, wherein a plurality of the first optical communication devices and a plurality of the second optical communication devices are provided, the optical transmission method further including:

outputting, by a wavelength division multiplexing multiplexer, a multiplexed signal obtained by wavelength division multiplexing a plurality of optical signals output by the plurality of the first optical communication devices;

splitting, by a wavelength division multiplexing demultiplexer, the multiplexed signal on a wavelength basis and outputs resulting signals to a plurality of the second optical communication devices, wherein performing, by the a plurality of first FBG-DCMs, wavelength dispersion compensation on the plurality of optical signals output by the plurality of the first optical communication devices and then outputs, to the wavelength division multiplexing multiplexer, the plurality of optical signals after the wavelength dispersion compensation.

4. An optical transmission method in an optical transmission system comprising a first optical communication device, a second optical communication device, and a first fiber bragg gratings-based continuous Dispersion Compensation Modules (FBG-DCM), further comprising:

outputting, by the first optical communication device, an optical signal;

performing, by the first FBG-DCM, wavelength dispersion compensation on the optical signal output by the first optical communication device;

receiving, by the second optical communication device, the optical signal wavelength-dispersion compensated by the first FBG-DCM through a first transmission path of an optical fiber;

detecting, by the second optical communication device, a received signal quality based on the received optical signal wavelength-dispersion compensated and providing, by the second optical communication device, feedback on the detected information on the received signal quality to the first optical communication device, wherein a plurality of the first optical communication devices and a plurality of the second optical communication devices are provided, the optical transmission system further comprising:

outputting, by a wavelength division multiplexing multiplexer, a multiplexed signal obtained by wavelength division multiplexing a plurality of optical signals output by the plurality of the first optical communication devices;

splitting, by a wavelength division multiplexing demultiplexer, the multiplexed signal on a wavelength basis and outputs resulting signals to a plurality of the second optical communication devices, wherein performing, by the first FBG-DCM, wavelength dispersion compensation on the multiplexed signal output by the wavelength division multiplexing multiplexer and then outputs, to the first optical transmission path, the multiplexed signal after the wavelength dispersion compensation or performing, by the a plurality of first FBG-DCMs, wavelength dispersion compensation on the plurality of optical signals output by the plurality of the first optical communication devices and then outputs, to the wavelength division multiplexing multiplexer, the plurality of optical signals after the wavelength dispersion compensation, wherein the optical transmission system further comprising a second FBG-DCM, and the method further comprises:

outputting, by the second optical communication device, the optical signal, performing, by the second FBG-DCM, wavelength dispersion compensation on the optical signal output by the second optical communication device, and receiving, by the first optical communication device, the optical signal wavelength-dispersion compensated by the second FBG-DCM through a second optical transmission path of an optical fiber, wherein a plurality of the first optical communication devices and the plurality of the second optical communication devices are provided, the optical transmission method further including:

outputting, by a first wavelength division multiplexing multiplexer, a first multiplexed signal obtained by wavelength division multiplexing a plurality of optical signals with different wavelengths from one another output by the plurality of the first optical communication devices;

outputting, by a second wavelength division multiplexing multiplexer, a second multiplexed signal obtained by wavelength division multiplexing a plurality of optical signals with different wavelengths from one another output by the plurality of second optical communication devices;

splitting, by a first wavelength division multiplexing demultiplexer, the second multiplexed signal on a wavelength-basis and outputs the resulting signals to the plurality of the first optical communication devices; and splitting, by a second wavelength division multiplexing demultiplexer, the first multiplexed signal on a wavelength-basis and outputs the resulting signals to the plurality of second optical communication devices, wherein performing, by the plurality of first FBG-DCMs, wavelength dispersion compensation on optical signals with different wavelengths from one another output by the plurality of the first optical communication devices and outputs the resulting signals to the first wavelength division multiplexing multiplexer, and performing by a plurality of second FBG-DCMs, wavelength dispersion compensation on optical signals with different wavelengths from one another output by the plurality of second optical communication devices and output the resulting signals to the second wavelength division multiplexing multiplexer.

\* \* \* \* \*